US011409922B2

(12) United States Patent
Aimone et al.

(10) Patent No.: US 11,409,922 B2
(45) Date of Patent: Aug. 9, 2022

(54) DEVICES AND METHODS FOR INCREASING THE SPEED AND EFFICIENCY AT WHICH A COMPUTER IS CAPABLE OF MODELING A PLURALITY OF RANDOM WALKERS USING A DENSITY METHOD

(71) Applicant: National Technology & Engineering Solutions of Sandia, LLC, Albuquerque, NM (US)

(72) Inventors: James Bradley Aimone, Albuquerque, NM (US); William Mark Severa, Albuquerque, NM (US); Richard B. Lehoucq, Albuquerque, NM (US); Ojas D. Parekh, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1008 days.

(21) Appl. No.: 16/020,627

(22) Filed: Jun. 27, 2018

(65) Prior Publication Data

US 2020/0004902 A1 Jan. 2, 2020

(51) Int. Cl.
*G06N 3/08* (2006.01)
*G06N 3/063* (2006.01)
*G06F 30/20* (2020.01)
*G06N 3/04* (2006.01)
*G06F 111/10* (2020.01)

(52) U.S. Cl.
CPC ............. *G06F 30/20* (2020.01); *G06N 3/049* (2013.01); *G06N 3/063* (2013.01); *G06N 3/08* (2013.01); *G06F 2111/10* (2020.01)

(58) Field of Classification Search
CPC . G06N 3/00–3/04; G06N 3/049–3/063; G06N 3/067; G06N 3/08–3/126
See application file for complete search history.

(56) References Cited

U.S. PATENT DOCUMENTS

2014/0280358 A1* 9/2014 Coalson .............. G06F 16/9024
707/798

OTHER PUBLICATIONS

Yaguang Li, Rose Yu, Cyrus Shahabi, & Yan Liu. (2018). Diffusion Convolutional Recurrent Neural Network: Data-Driven Traffic Forecasting. (Year: 2018).*

(Continued)

*Primary Examiner* — Kakali Chaki
*Assistant Examiner* — Johnathan R Germick
(74) *Attorney, Agent, or Firm* — Yee & Associates, P.C.

(57) ABSTRACT

A method for increasing a speed or energy efficiency at which a computer is capable of modeling a plurality of random walkers. The method includes defining a virtual space in which a plurality of virtual random walkers will move among different locations in the virtual space, wherein the virtual space comprises a plurality of vertices and wherein the different locations are ones of the plurality of vertices. A corresponding set of neurons in a spiking neural network is assigned to a corresponding vertex such that there is a correspondence between sets of neurons and the plurality of vertices, wherein a spiking neural network comprising a plurality of sets of spiking neurons is established. A virtual random walk of the plurality of virtual random walkers is executed using the spiking neural network, wherein executing includes tracking how many virtual random walkers are at each vertex at a given time increment.

21 Claims, 18 Drawing Sheets

(56) References Cited

OTHER PUBLICATIONS

Rueckauer B, Lungu I-A, Hu Y, Pfeiffer M and Liu S-C (2017) Conversion of Continuous-Valued Deep Networks to Efficient Event-Driven Networks for Image Classification. Front. Neurosci. 11:682. doi: 10.3389/fnins.2017.00682 (Year: 2017).*

Florian Müller-Plathe (1998). Diffusion of water in swollen poly-(vinyl alcohol) membranes studied by molecular dynamics simulation. Journal of Membrane Science, 141(2), 147-154. (Year: 1998).*

Wang Zhe, K. Nguyen, R. Thawonmas, & F. Rinaldo (2012). Using Monte-Carlo Planning for Micro-Management in Starcraft (Year: 2012).*

Shibani Santurkar and Bipin Rajendran (2014). Sub-threshold CMOS Spiking Neuron Circuit Design for Navigation Inspired by C. elegans Chemotaxis. CoRR, abs/1410.7883. (Year: 2014).*

D. P. Onoma, S. Ruan, I. Gardin, G. A. Monnehan, R. Modzelewski and P. Vera, "3D random walk based segmentation for lung tumor delineation in PET imaging," 2012 9th IEEE International Symposium on Biomedical Imaging (ISBI), 2012, pp. 1260-1263, doi : 10.1109/ISBI.2012.6235791. (Year: 2012).*

W. Maass, "To Spike or Not to Spike: That Is the Question," in Proceedings of the IEEE, vol. 103, No. 12, pp. 2219-2224, Dec. 2015, doi: 10.1109/JPROC.2015.2496679. (Year: 2015).*

\* cited by examiner

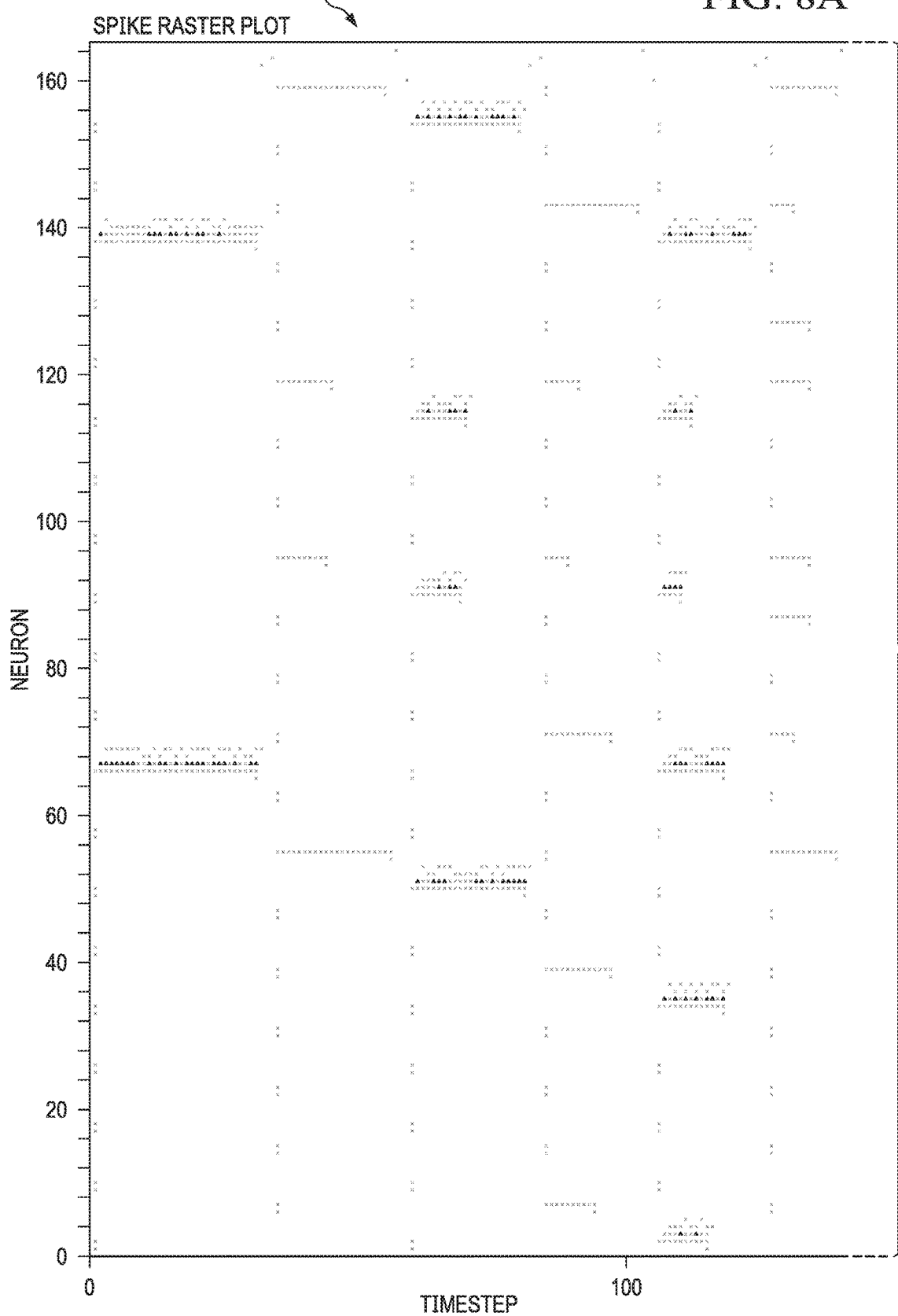

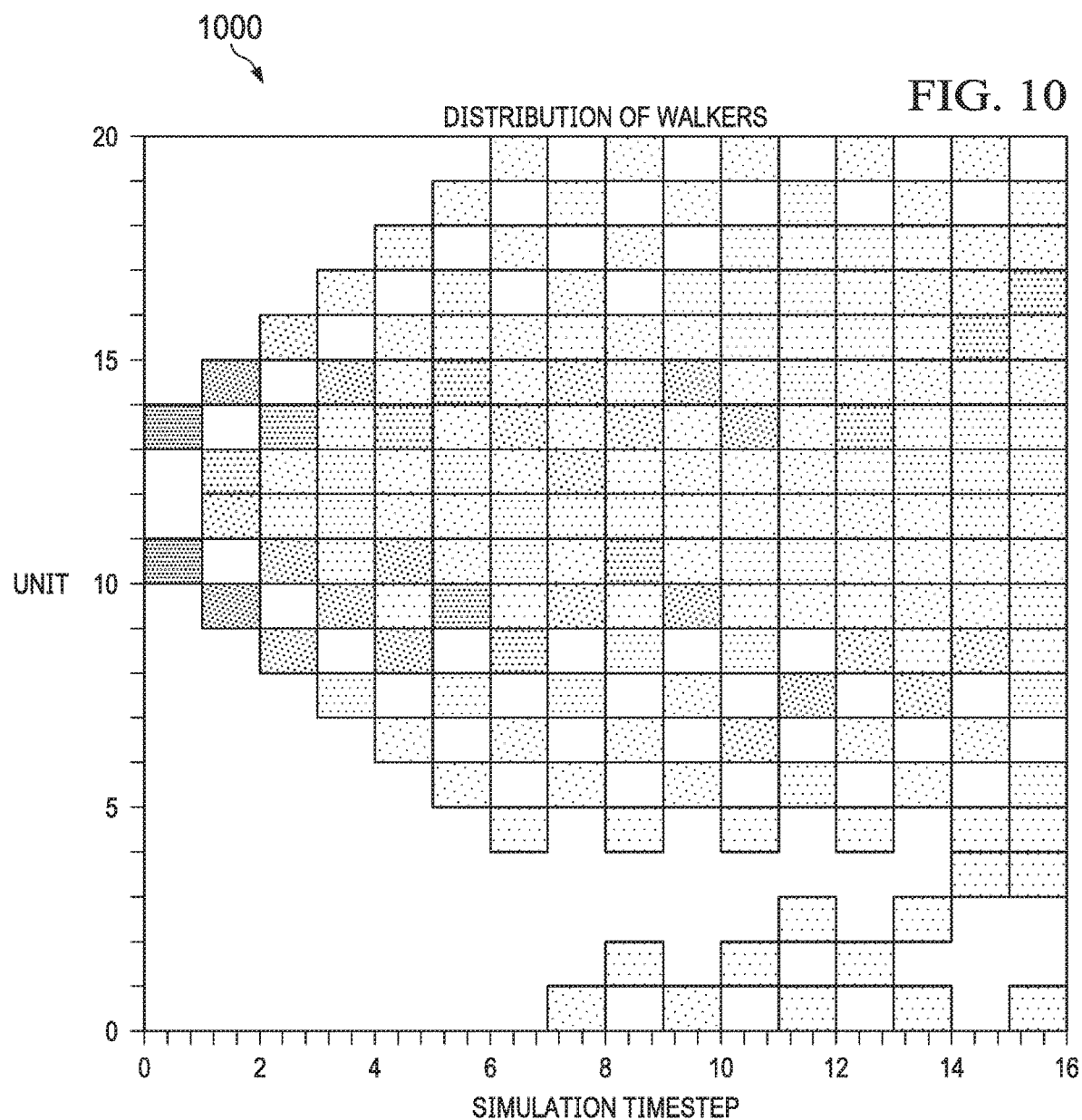

DEVICES AND METHODS FOR INCREASING THE SPEED AND EFFICIENCY AT WHICH A COMPUTER IS CAPABLE OF MODELING A PLURALITY OF RANDOM WALKERS USING A DENSITY METHOD

STATEMENT OF GOVERNMENT INTEREST

Government Interest

This invention was made with Government support under Contract No. DE-NA0003525 awarded by the United States Department of Energy/National Nuclear Security Administration. The Government has certain rights in the invention.

CROSS-REFERENCE TO RELATED APPLICATION

Related Application

This application is related to U.S. Patent Application entitled "Devices and Methods for Increasing the Speed and Efficiency at which a Computer is Capable of Modeling a Plurality of Random Walkers Using a Particle Method", U.S. application Ser. No. 16/020,619, filed even date hereof, and incorporated herein by reference in its entirety.

BACKGROUND INFORMATION

Field

The present disclosure relates to devices and methods for increasing the speed and efficiency at which a computer is capable of modeling a plurality of random walkers.

Background

Speed and efficiency of scientific computers is increasingly important. Electrical power consumption by a computer performing a scientific calculation, such as modeling a large number of random walkers, can increase heat output, damage equipment, reduce equipment efficiency, slow computations, and waste both cooling power and direct electrical power required to operate the scientific computer. Additionally, less efficient means of performing calculations wastes time, which also wastes money. Thus, methods and devices are required to improve both the computer and the computational method for performing scientific calculations, such as modeling a large plurality of random walkers in a computer.

SUMMARY

The illustrative embodiments provide for a method for increasing a speed or energy efficiency at which a computer is capable of modeling a plurality of random walkers. The method includes defining, using a processor, a virtual space in which a plurality of virtual random walkers will move among different locations in the virtual space, wherein the virtual space comprises a plurality of vertices and wherein the different locations are ones of the plurality of vertices. The method also includes assigning, using the processor, a corresponding set of neurons in a spiking neural network to a corresponding vertex such that there is a correspondence between sets of neurons and the plurality of vertices, wherein a spiking neural network comprising a plurality of sets of spiking neurons is established. The method also includes executing, using the processor, a virtual random walk of the plurality of virtual random walkers using the spiking neural network, wherein executing includes tracking how many virtual random walkers are at each vertex at a given time increment.

The illustrative embodiments also provide for an application-specific integrated circuit (ASIC). The ASIC includes a processor architecture that implements a spiking neural network comprising a plurality of sets of spiking neurons, wherein each set of spiking neurons is assigned to calculate how many virtual random walkers are at each vertex in a defined virtual space at a given time increment.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 8A-8D illustrate a spike raster plot for a one-dimensional random walk, in accordance with an illustrative embodiment;

FIG. 10 illustrates a graph of walker distribution over time for a one-dimensional random walk, in accordance with an illustrative embodiment;

DETAILED DESCRIPTION

Preview

Figure 1:
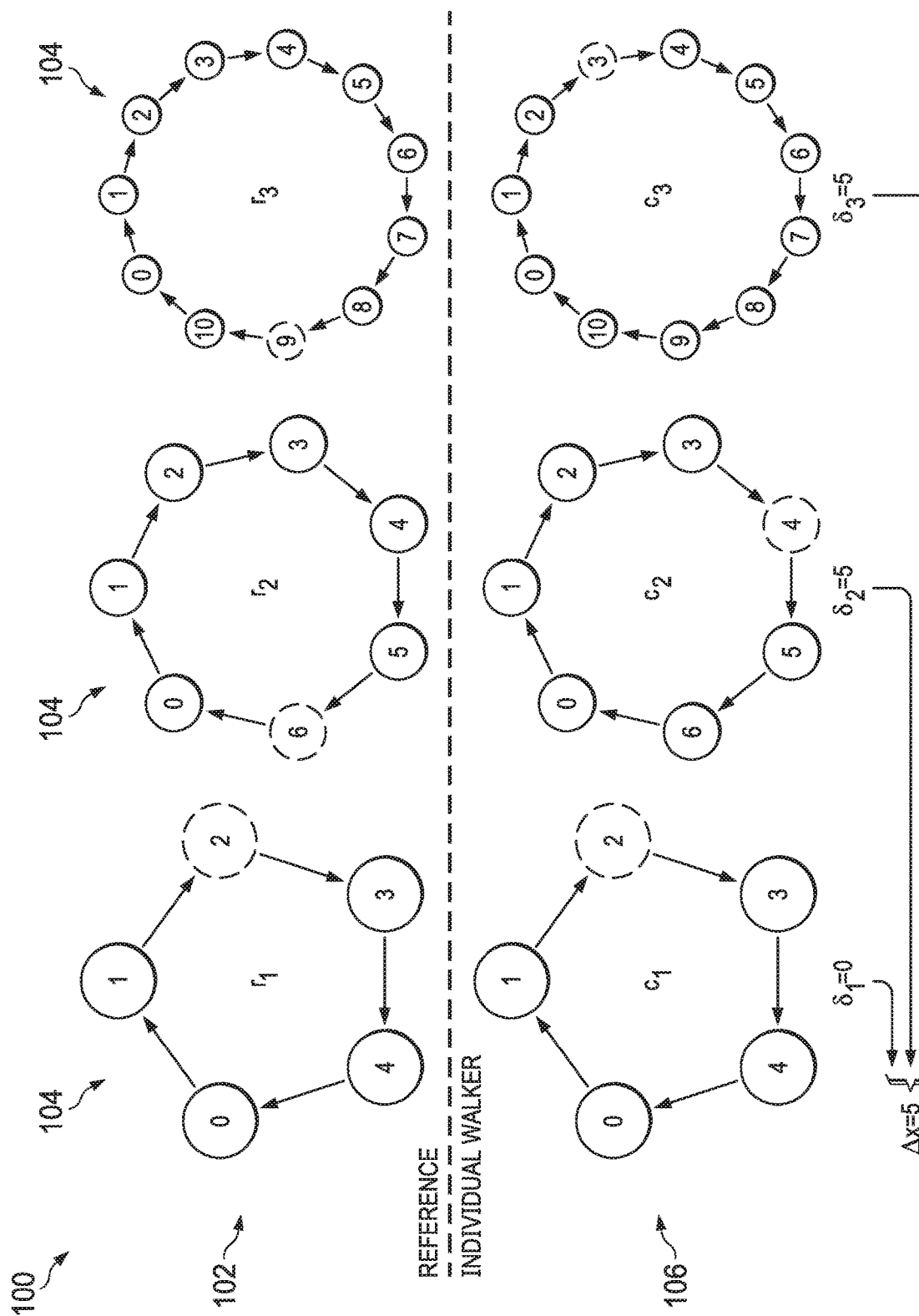
FIG. 1 illustrates modular oscillator code for a spiking neural network, in accordance with an illustrative embodiment.

The illustrative embodiments recognize and take into account that, the random walk is a fundamental stochastic process that underlies many numerical tasks in scientific computing applications. We consider here two neural algorithms that can be used to efficiently implement random walks on spiking neuromorphic hardware. The first method tracks the positions of individual walkers independently by using a modular code inspired by the grid cell spatial representation in the brain. The second method tracks the densities of random walkers at each spatial location directly. We analyze the scaling complexity of each of these methods and illustrate their ability to model random walkers under different probabilistic conditions.

INTRODUCTION

The classic random walk, a stochastic process, underlies many numerical computational tasks. The random walk is a direct reflection of the underlying physical process and models Brownian Motion, among other processes. Random walks have found myriad applications across a range of scientific disciplines including computer science, mathematics, physics, operations research, and economics. For instance, the treatment of ionic movements as a random walk process is critical to deriving Nernst-Plank dynamics for ions in understanding the biophysics of neurons. Additionally, random walks are also used in non-physics domains, such as financial option pricing and ecology.

Random walks are typically straightforward to implement, in a power inefficient manner, and can be computationally appealing in high dimensional domains that are ill-suited for other numerical approaches. Because they are typically used to independently sample a population, simulations of many random processes are easily distributed across a parallel machine; with each computational core responsible for a distinct process. However, the utility of multi-core systems for multi-agent models such as random walks is still limited in many applications [5]. Most simulations that utilize random walks to statistically arrive at a solution require the aggregation of a population of walkers before any conclusions can be made. Thus, while the walkers themselves are easily parallelized, the overall simulation is still constrained by the integration of information across the population.

The illustrative embodiments have recognized that neuromorphic hardware presents a compelling architecture to consider the implementation of random processes. In the ideal, a neuromorphic platform can be viewed as an incredibly large parallel architecture, albeit one with very simple processors (i.e., the neuron) [6]. In particular, we have shown that neuromorphic platforms that leverage spiking neurons, such as the leaky integrate-and-fire (LIF) neuron, and have inherent capability for probabilistic sampling, such as either stochastic synapses or probabilistic thresholds, may offer compelling advantages for modeling a random walk process.

This document describes two spiking neural circuits for simulating random walkers. We then analyze these models in the context of emerging neuromorphic computing architectures, such as the Intel Loihi chip [7] and the ARM-core based Manchester SpiNNaker platform [8]. We note that the approach taken here for modeling stochastic processes relies on relatively small circuits with very precise use of stochastic events, whereas an alternative approach to modeling stochastic inference consists of more dynamical population models of neurons [9]

Random Walk Model

Consider a system, S, that includes a graph, such as a mesh, of discrete locations. For simplicity, we will consider the case where the graph is a lattice of N grid points along each of D dimensions, although in practice a lattice is not a requirement. Within S is a population that evolves through a random walk process that is suitable to model as a population of independent particles, such as a diffusion process where each particle moves through space according to a Brownian motion evolution. In one illustrative embodiment, we consider only the case where each particle is independent without interactions, though such interactions could be taken into account. If a simulation models K independent particles, then the average position of the K particles approaches the expected value of the population at a rate of $O(1/\sqrt{K})$ as a consequence of the central limit theorem.

FIG. 1 illustrates modular oscillator code 100 for a spiking neural network, in accordance with an illustrative embodiment. Top panel 102 shows reference oscillators 104, with rings of size 5, 7, and 11. Individual walker have equivalent sized rings. When not moving, all oscillators progress forward at same speed; however, if a particle takes a random step, its individual rings will advance relative to the reference. The position of each walker can then be decoded from these modular differences. Bottom panel 104 shows individual walkers being modeled by the circuit.

Neural Model of a Random Walk

In this document, we consider two neural circuit approaches to modeling a population of random walkers. The first is a neural circuit to perform the task of modeling each walker independently as it moves over a space, which we call the particle method. The second approach is a neural circuit that tracks the number of particles at each given location in a simulation. This method effectively tracks the distribution of particles over the whole space, as we refer to it as the density method. The following two sections describe the motivation and circuits used to compute these respective methods, and the subsequent section describes the simulations performed to illustrate these approaches efficacy. Importantly, as one of the motivating features of spiking neuromorphic hardware is its potential advantages in energy consumption, we consider here not only the required neuron resources and time to simulate these models, but also estimate the energy consumption of these models, for which number of spiking events is generally considered a first-order proxy.

Particle Neural Models of Random Walk

The most straightforward approach to modeling a random walk is to commit a subset of neurons to modeling each particle independently. A neural algorithm for a particle includes three parts: the stochastic process, which determines what random action is taken, a spatial location, which tracks the location, and an action circuit, which updates the location based on the output of the stochastic process and any boundary conditions, if relevant.

In most implementations, the dominating neuron cost for simulating individual walkers will be the spatial location. Even if particles are relatively restricted in their local movements, each particle circuit must be able to represent all spatial locations that are relevant for the simulation. Thus, if space (i.e., number of neurons) is the primary consideration, a compact code, such as a binary representation is well suited, as it requires only $O(D \log N)$ neurons to represent space. However, a binary code is non-trivial to update using neurons, and the average activity of the network is relatively dense. Alternatively, a unary code, where one neuron represents each spatial location, can be highly energy efficient (only one spike required to communicate location) and straightforward to update, albeit spatially impractical (requires $O(N^D)$ neurons to represent space).

Here, we present a neural algorithm that lies between these extremes, offering a compromise between a binary and unary representation of space.

1) A modular spatial code balances compactness and energy efficiency: One potential model that lies between unary and binary is a modular code, also known as a residue numeral system. Our approach to implementing a modular code is shown in FIG. 1.

For each dimension, the particle circuit will have M ring oscillators, each with a unique prime number of neurons, $C_i$ for $i \leq M$, with states at time t, $c_i(t)$ for $i \leq M$ with the combined state represented by the vector $C(t)=[c_1(t), c_2(t), c_M t]$, where each state is the integer index of which neuron is active in each ring. This provides the circuit with $C_M = \Pi C_i$ possible states. For example, consider a particle with M=3 and $C_1$=3, $C_2$=5, and $C_3$=7, then the particle's spatial code would have $C_M$=105 possible states.

To implement the random walk in neurons, we consider the case where a position x is encoded by the offset between the particle's state vector C and an equivalently sized reference population, R, which consists of rings of the same size. At each time-step, for the state of each ring oscillator in the reference and particles advances by one, $$c_i(t+1) = \begin{cases} c_i(t)+1, & \text{if } c_i(t) < c_i \\ 0, & \text{Otherwise} \end{cases} \quad (1)$$

The position, x is then generated from C and R by subtracting the two states. For each oscillator, a difference $$\delta_i = (c_i - r_i) \bmod c_i \quad (2)$$

is computed, from which we know, by the Chinese Remainder Theorem, that the position, x, can be decoded. (One useful reference may be pages 873-876 in [11].) One extension of residual codes such as these is that addition and multiplication involving x can be performed by the equivalent modular arithmetic operation on each of the component rings. Therefore, a change of $\Delta x$ in the position of a walker can be represented by adding $\Delta x$ to each of the states $c_i(t)$.

Figure 2:
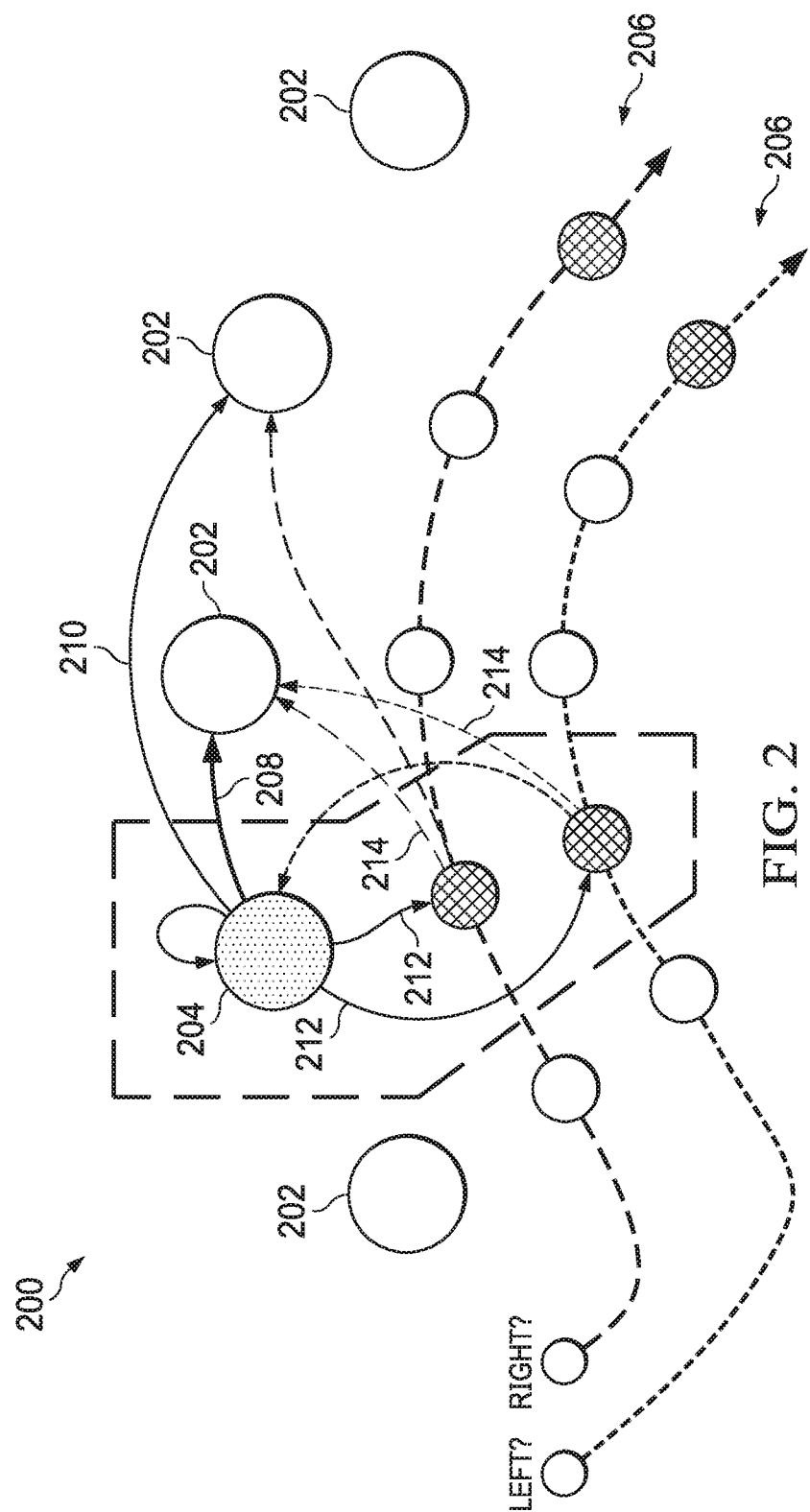
FIG. 2 illustrates a schematic of a spiking neural circuit to construct ring oscillators with update capabilities, in accordance with an illustrative embodiment.

FIG. 2 illustrates a schematic of a spiking neural circuit to construct ring oscillators with update capabilities, in accordance with an illustrative embodiment. Schematic 200 includes principal ring neurons 202, with the active neuron 204. Update neurons 206 are below the ring neuron, and can be reused. Assigned neurons are at least three apart. Line 208 between adjacent ring neurons is weight 0:5 and delay 2. Lines 210 between other ring neurons are weight 0:5 and delay 2. Lines 212 to update neurons are weight 0:5 delay 1. Lines 214 are 0:5 and delay 1. Movement source inputs are weight 0:5 and delay 1.

Attention is now turned to structuring a neural circuit to advance a ring oscillator continuously. Each ring of $C_i$ size is composed of $C_i$ LIF neurons connected in a ring configuration, with the synaptic efficacy being sufficient to drive the downstream neuron to fire. However, a non-obvious circuit is necessary to reliably speed up or slow down the oscillators if the random walk moves the location. FIG. 2 shows one circuit solution that uses spike delays to 'add' and 'subtract' to the position of the ring by one using spike delays. The integrate-and-fire neurons in this circuit all have a spiking threshold of 1, a reset value of 0, and immediate decay (i.e., a time constant of 0). In this implementation, a ring neuron at location i is connected to the neuron at i+1 with a weight 1, and to the neuron at i+2 and to itself with weight 0:5. Each of these ring connections has a delay of 2. With this setup, without any other inputs the ring will advance by one state every 2 clock cycles.

A secondary circuit is then placed on all rings of a walker to advance or stall the circuit (thus generating an offset relative to the reference). We consider here the case where the particle has three potential movements ('left', 'right', or 'stay') along a given dimension; with a source neuron for each direction using a stochastic threshold or synapse to determine whether to move in one direction or not and communicating that action to each of the particle's rings for that dimension. The currently active ring neuron, i, sends an input of weight 0:5 and delay 1 to both of its respective update neurons. In the case where the circuit is advanced (labeled 'right' in FIG. 2), all positive update neurons get a 0:5 input as well, allowing the appropriate positive update neuron to fire. That neuron then sends a +0:5 to the i+2 ring neuron and a −0:5 to the i+1 ring neuron, effectively shifting the ring forward by 1. The negative update is similar, except for driving the source i neuron rather than the i+2 neuron.

Importantly, because the rings are only locally activated and impact up to two ring neurons away, these update neurons can be reused every three ring neurons. Ultimately, this fact means either four or five pairs of update neurons are required, because there are a prime number of ring neurons. While the above update circuit is designed to shift rings forward or backwards by one relative to its internal dynamics, similar circuits can be generated to move other distances.

The dynamical representation of position as the offset of these oscillators confers several advantages. First, it is consistent with the transient state of neurons. Rather than a neuron having to self-activate to maintain a state, the ring simply evolves at a steady rate when position is not changing. Second, it allows updates to be more efficiently implemented. When there is a random movement of the particle, in whatever dimension is being considered, the particle's rings are in unison accelerated or decelerated by one. The use of a common reference for all particles also allows changes in the frame of reference to be efficiently accounted for as well—a simple shift in the reference state is the equivalent of shifting all the particles in unison. This feature may be of use in models where an observer of a random walk is itself in motion. Similarly, because the reference is used only in the decoding of position, it is possible to have multiple references, or to readily compute the distance between particles without using a reference at all.

Attention is now turned to the complexity of the oscillator particle model. Each walker for the above model requires $2+\Sigma C_i+2^*(3+C_i \bmod 3)$ neurons and $\Sigma 9^*C_i+2^*(3+C_i \bmod 3)$ synapses. Only one spike is required per ring, for M total, when there are no updates, and M+1 additional spikes required for an update. There is a global cost as well, with an additional set of rings for the reference position (although unless the reference position is also in motion, update neurons would not be required). Each dimension would consist of its own rings.

This model presents a useful trade-off between a dense code, with many rings, and a sparse code, which is more energy efficient but requires more neurons to cover a space. The dense code would approach O(D log N) total neurons, with systems with fewer rings approaching O(DN) total neurons and with a correspondingly lower number of spikes.

Figure 3:
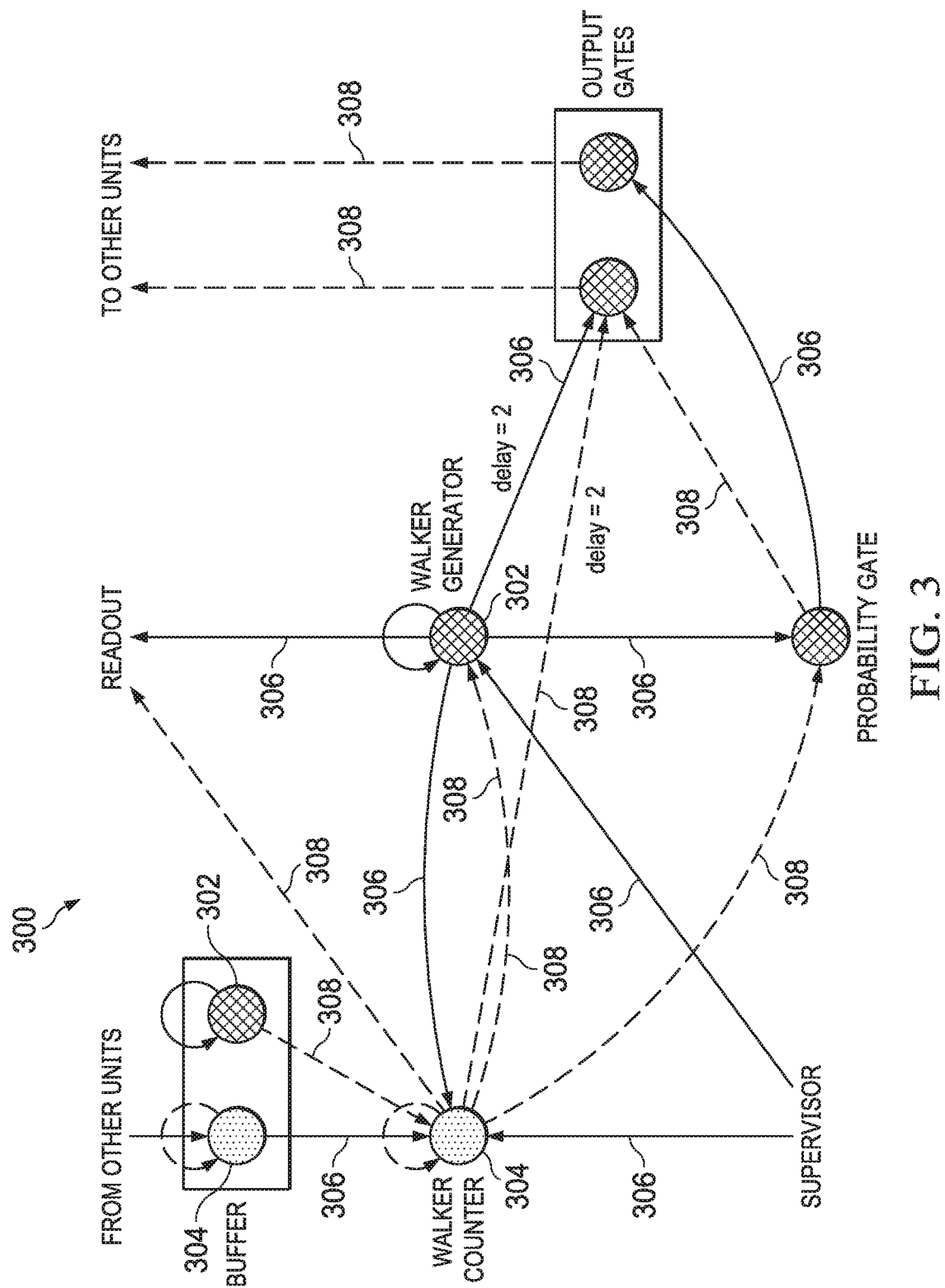
FIG. 3 illustrates a schematic of a two-neighbor unit, in accordance with an illustrative embodiment.

FIG. 3 illustrates a schematic of a two-neighbor unit, in accordance with an illustrative embodiment. In neighbor unit 300, circles represent neurons where empty circles 302 represent complete decay (Decay=1) and filled circles 304 represent no decay (Decay=0). Solid lines 306 represent excitatory connections. Dashed lines 308 are inhibitory. Weights are ±1 and delay is delay=1 unless marked. Thresholds are all 0:5 except for the filled (no decay) neurons that have threshold 0. The buffer circuit is optional and only used in synchronized mode, where all walkers take the same number of steps.

Density Model

One alternative to tracking the particles independently is to keep track of the density of particles at every location and randomly move walkers. The main advantage of a particle density approach is that the complexity of the spatial graph is independent of the number of walkers. While a density representation is the equivalent of the particle method in terms of producing estimated density distributions at different times, path dependent statistics are not readily available. Instead, they must be decoded from the timing of the spikes. This result can impact some application, such as estimating the prices of certain path-dependent financial options.

As in the particle model, we need to either discretize a continuous space or equivalently assume that the Markov process exists on a graph. For each node on the graph, we instantiate a spiking circuit which we call a unit. A schematic of a two-neighbor unit is pictured in FIG. 3. Within a component there exists several key components:

1) The walker counter is a simple neuron with threshold 0 and contains running count of the number of walkers at a given node. Walkers are passed from unit to unit by spikes with negative weight (inhibitory signal). Hence, a sub-threshold potential of −5 corresponds with 5 walkers being at the corresponding node.

2) The walker generator is a self excitatory neuron that 'counts' out the walkers stored in the walker counter. After being initiated by a separate supervisory signal, the walker counter sends positively weighted spikes to the walker counter, until the walker counter hits its threshold. At this point, all walkers have started their next transition and inhibition from the walker counter halts the walker generator.

3) Probability Gate and Output Gate: This group of neurons interacts with the output gates to ensure that each walker is sent to exactly one other unit, weighted by the specified probabilities. More specifically, a tree of neurons subdivides (through selective excitation and inhibition) the potential outputs according to conditional probabilities. In FIG. 3, the unit only has two neighbors and so only one neuron is needed for the random draw.

4) The buffer is an optional component for synchronized operation. Without the buffer, the walkers may each take a different number of steps. By incorporating a buffer, the walkers are first stored in the counter, sent to buffers of neighbor units, and then flushed from the buffers into the counters. Structurally, the buffer contains a counter and generator neuron.

The readout provides a mechanism for monitoring the simulation by observing the spikes being generated by the walker generator. This feature could be useful for auxiliary computation or in hardware systems where sub-threshold potentials are unobservable. All the simulations that follow were performed on a software simulator and so, since we can directly access the sub-threshold potentials, a readout mechanism was not needed.

A simulation using this density model is performed as a series of manually or automatically triggered tasks. Initially, current injection is used to place walkers at the desired initial position. Then, walkers are counted and distributed by sending an excitatory signal to the walker counter and walker generator. This procedure automatically sends walkers to neighboring nodes via the probability gate and output gate. We connect a 'walks complete' neuron downstream of the walker counters so that we know when all the walkers have been distributed. If the units use synchronization buffers, the buffers are cleared in the same way via an excitatory signal. Likewise, when the buffer is flushed, we use the resulting excitatory signal to trigger the next simulation timestep (i.e. the walkers take their next step). Referring to the terminology of the particle model, the stochastic process occurs within the probability gates, the spatial location is stored in the potentials of the walker counters, as each unit has a location, and the action circuit is a combination of the walker generator and the output gates.

This density-based approach allows for the neuron requirement to be tied only to the size of the underlying space/graph and not to the number of walkers. Overall, the neuron cost for a n-node graph is O(n) assuming the number of neighbors for any node is much smaller than the total number of nodes. The runtime is dependent on the number and distribution of walkers. The time taken to evaluate one simulation timestep is asymptotically linearly proportional to the largest number of walkers at a node.

We note that for this construction, we assume that the underlying neuron model is capable of stochastic firing. That is, after a threshold potential is exceeded, the neuron spikes according to the draw of a random number. This stochastic model is representative of currently available neuromorphic hardware. However, with more advanced neuron models, such as one that supports stochastic synapses (i.e. spikes are sent to post-synaptic neurons according to independent random draws) could allow for simplified circuits.

Figure 4:
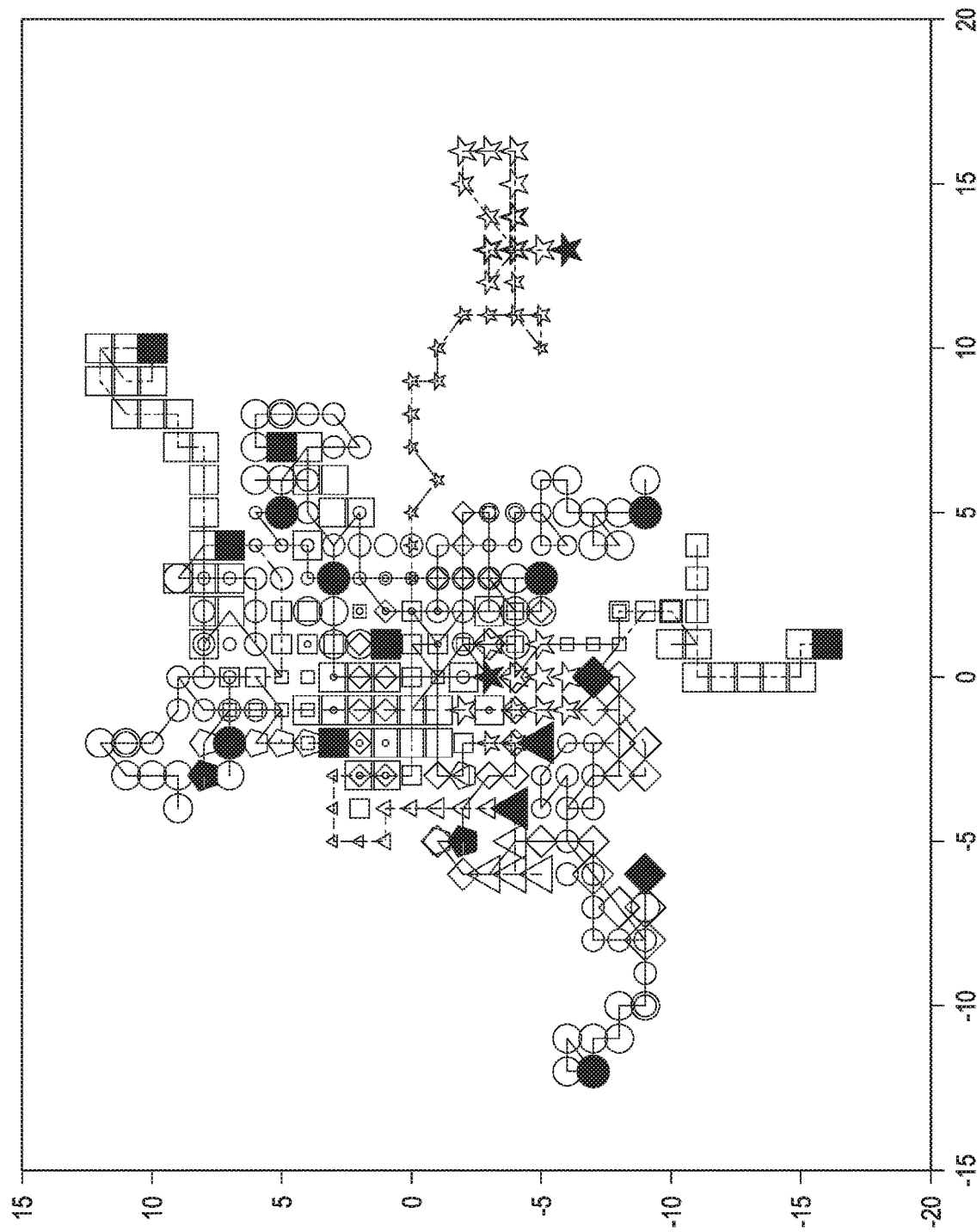
FIG. 4 illustrates a graph of a random walk of twenty particles over one hundred time-steps in free space originating at the origin, in accordance with an illustrative embodiment.
Figure 5:
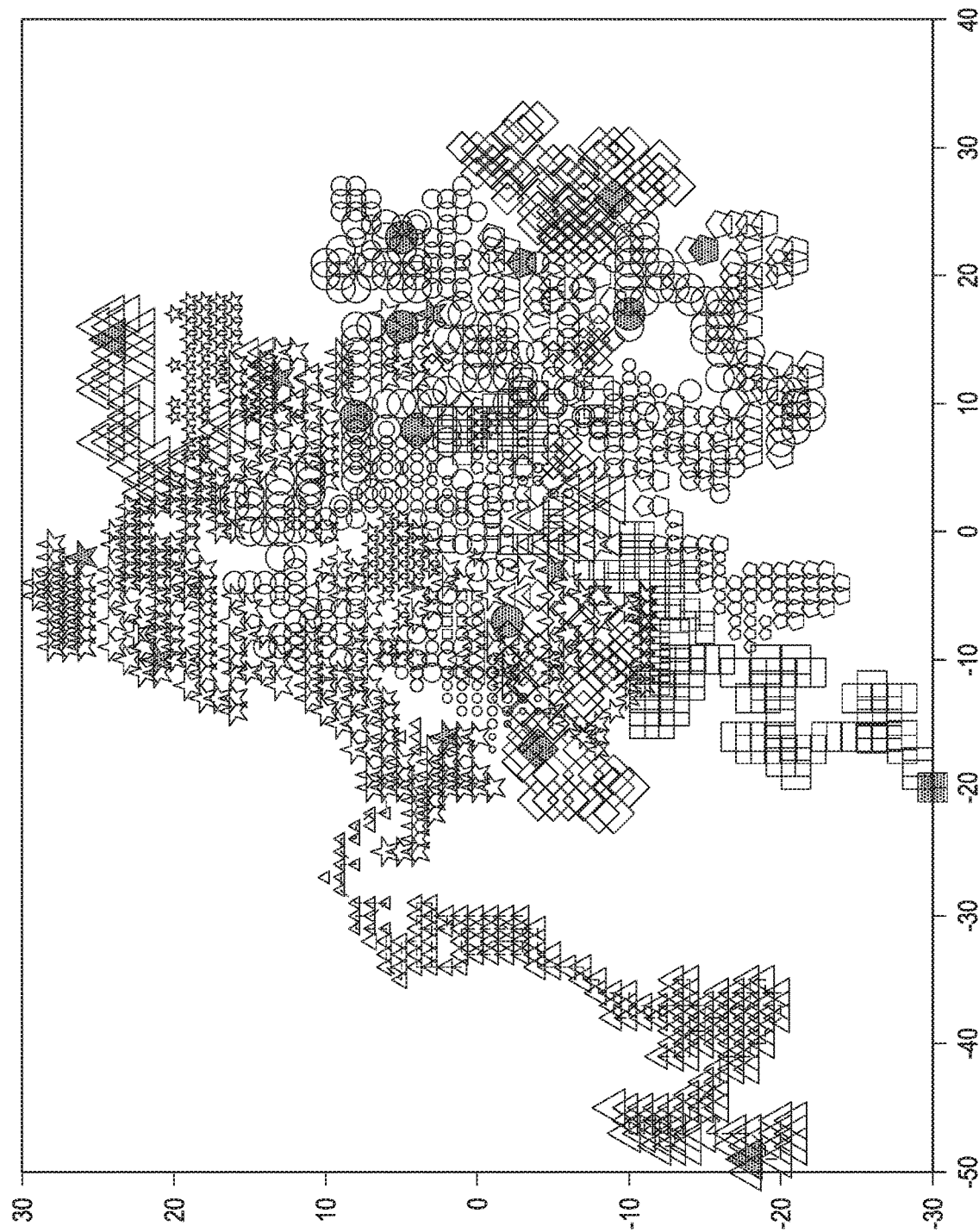
FIG. 5 illustrates a graph of a random walk of two particles over fifty time-steps in free space originating at the origin, in accordance with an illustrative embodiment.

FIG. 4 through FIG. 11 are simulations. Attention is first turned to results of particle simulations. First, we demonstrate the particle method by showing a random walk in free space. FIG. 4 illustrates the appropriate random trajectories of the particles over one hundred time-steps. FIG. 5 shows a longer time course, with particles moving for one thousand time-steps.

Next, we illustrate how more complex walks can be examined, such as non-uniform probabilities. FIG. 7 shows a case where random movement is biased heavily in the negative direction, with the movement of the particles drifting as a population towards the bottom left. One issue with the modular method described above is its behavior when a walker's position exceeds the precision of the neural circuit. Because the modular code described above has a finite capacity, eventually particles in a free space will drift beyond the provided spatial resolution, wrapping around the space as if it is a torus. An example of this effect is shown in FIG. 6, wherein a small modular code (rings of size 3 and 7) led to a perceived jump of the particle from position −10 to +10.

FIG. 4 illustrates a graph of a random walk of twenty particles over one hundred time-steps in free space originating at the origin, in accordance with an illustrative embodiment. FIG. 4 shows a simulation with a balanced probability of moving in either dimension equal to 0.25. Each particle used rings of size 5, 7, and 11 neurons. Steps are represented by progressively larger circles, with the solid dot representing the end location.

FIG. 5 illustrates a graph of a random walk of two particles over fifty time-steps in free space originating at the origin, in accordance with an illustrative embodiment. FIG. 5 shows a simulation with a balanced probability of moving in either dimension equal to 0.25. Each particle used rings of size 5, 7, and 11 neurons.

Figure 6:
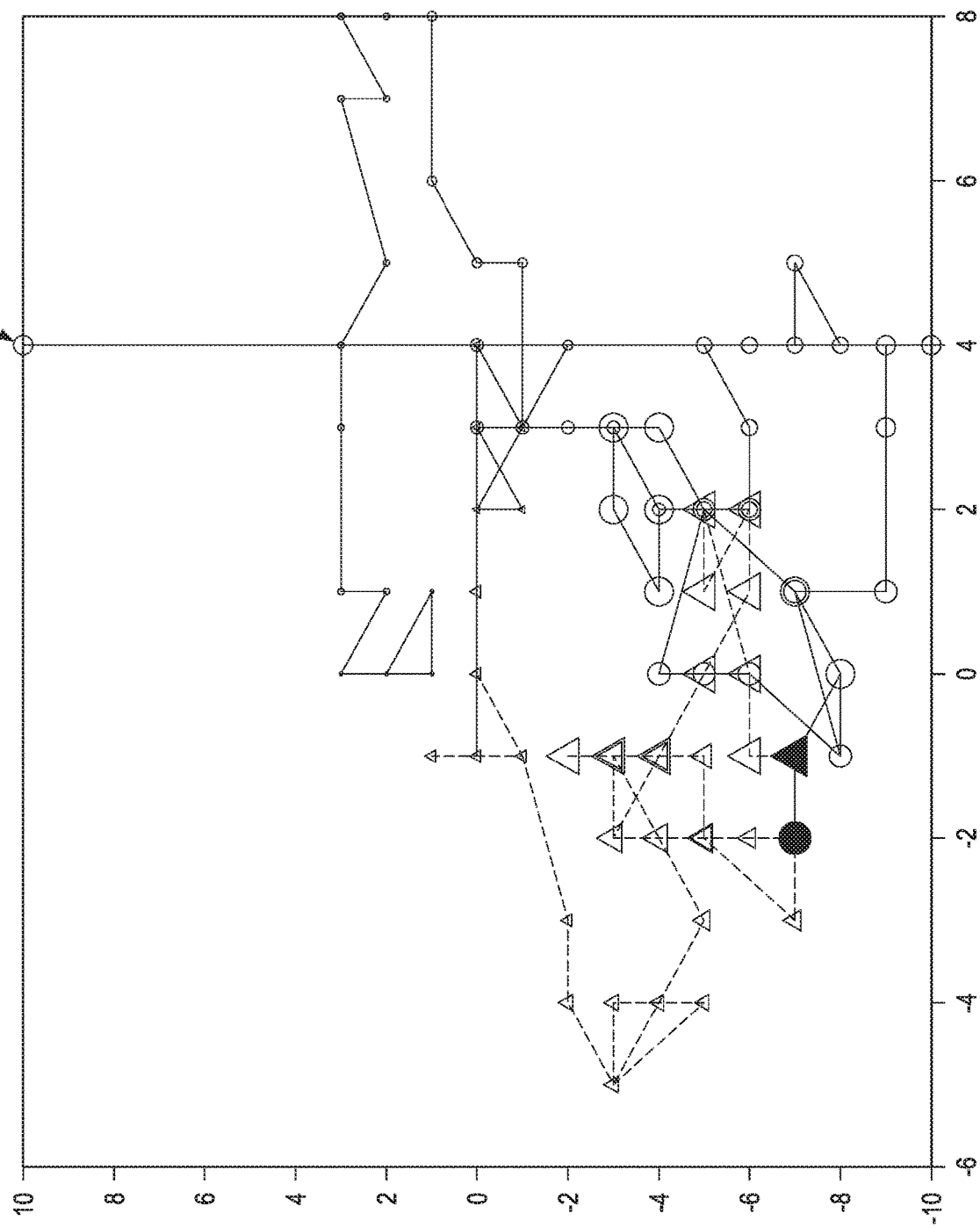
FIG. 6 illustrates a graph of a random walk of twenty particles over one thousand time-steps in free space originating at the origin, in accordance with an illustrative embodiment.
Figure 7:
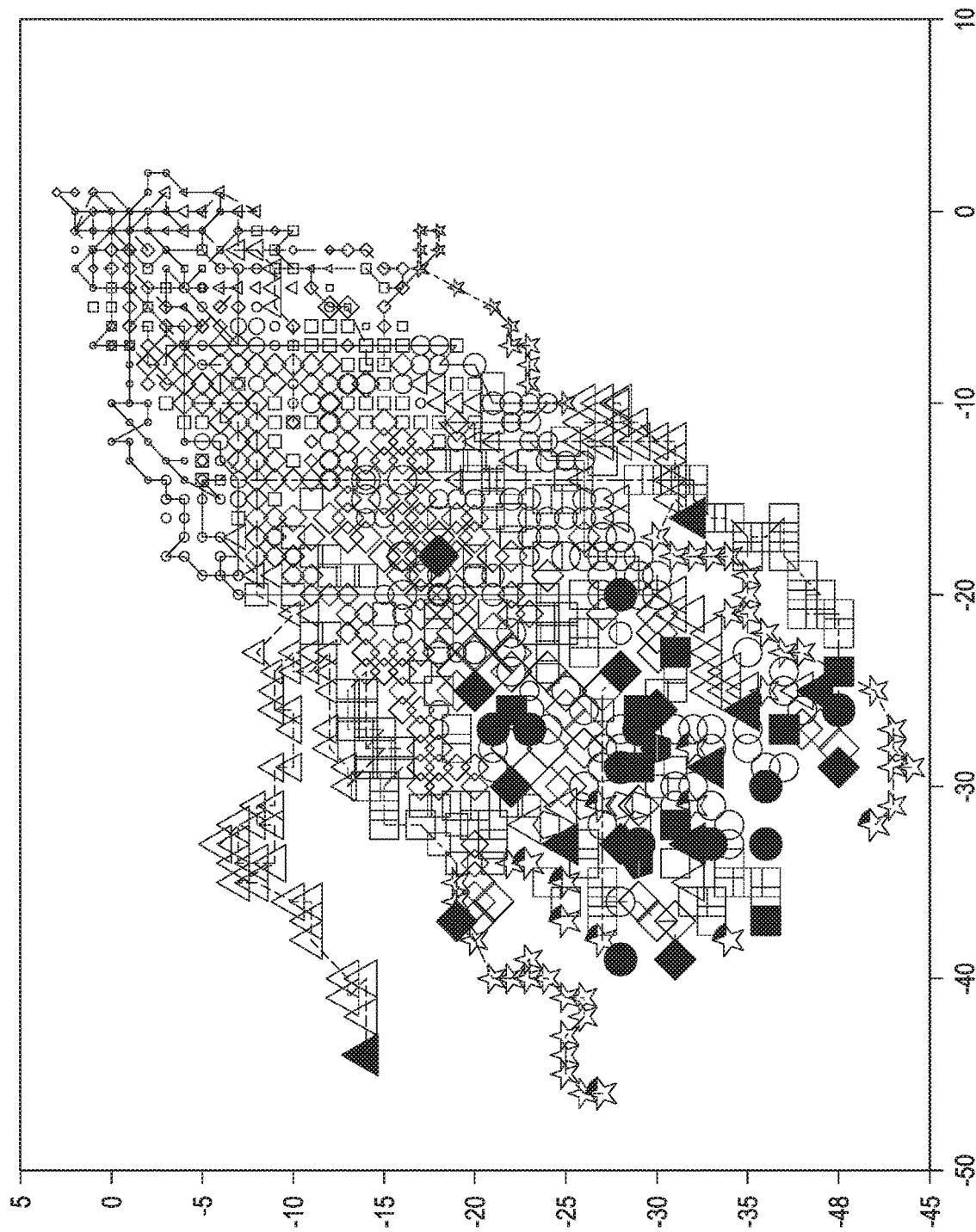
FIG. 7 illustrates a graph of a random walk of fifty particles over two hundred time-steps in free space originating at the origin, in accordance with an illustrative embodiment.

FIG. 6 illustrates a graph of a random walk of twenty particles over one thousand time-steps in free space originating at the origin, in accordance with an illustrative embodiment. FIG. 6 shows a simulation with a balanced probability of moving in either dimension equal to 0.25. Each particle used rings of size 3 and 7. Note the misencoding of particle 600 due to reaching the capacity of the code.

FIG. 7 illustrates a graph of a random walk of fifty particles over two hundred time-steps in free space originating at the origin, in accordance with an illustrative embodiment. FIG. 7 shows a simulation with a weighted probability (of 20%) of moving in the negative direction in each dimension, versus 5% of moving in the positive direction. Each particle used rings of size 5, 7, and 11 neurons.

Figure 8B:
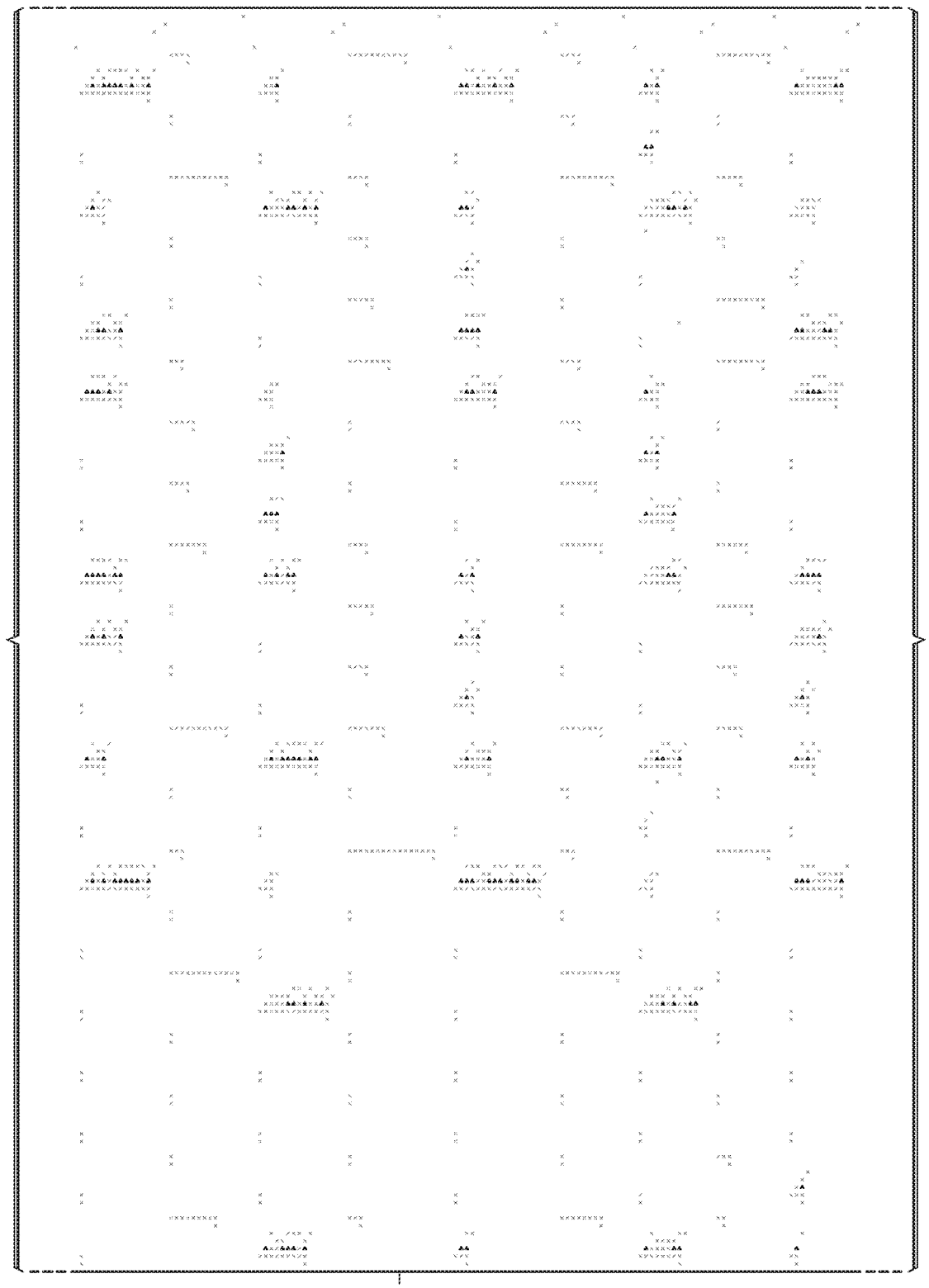
Figure 8C:
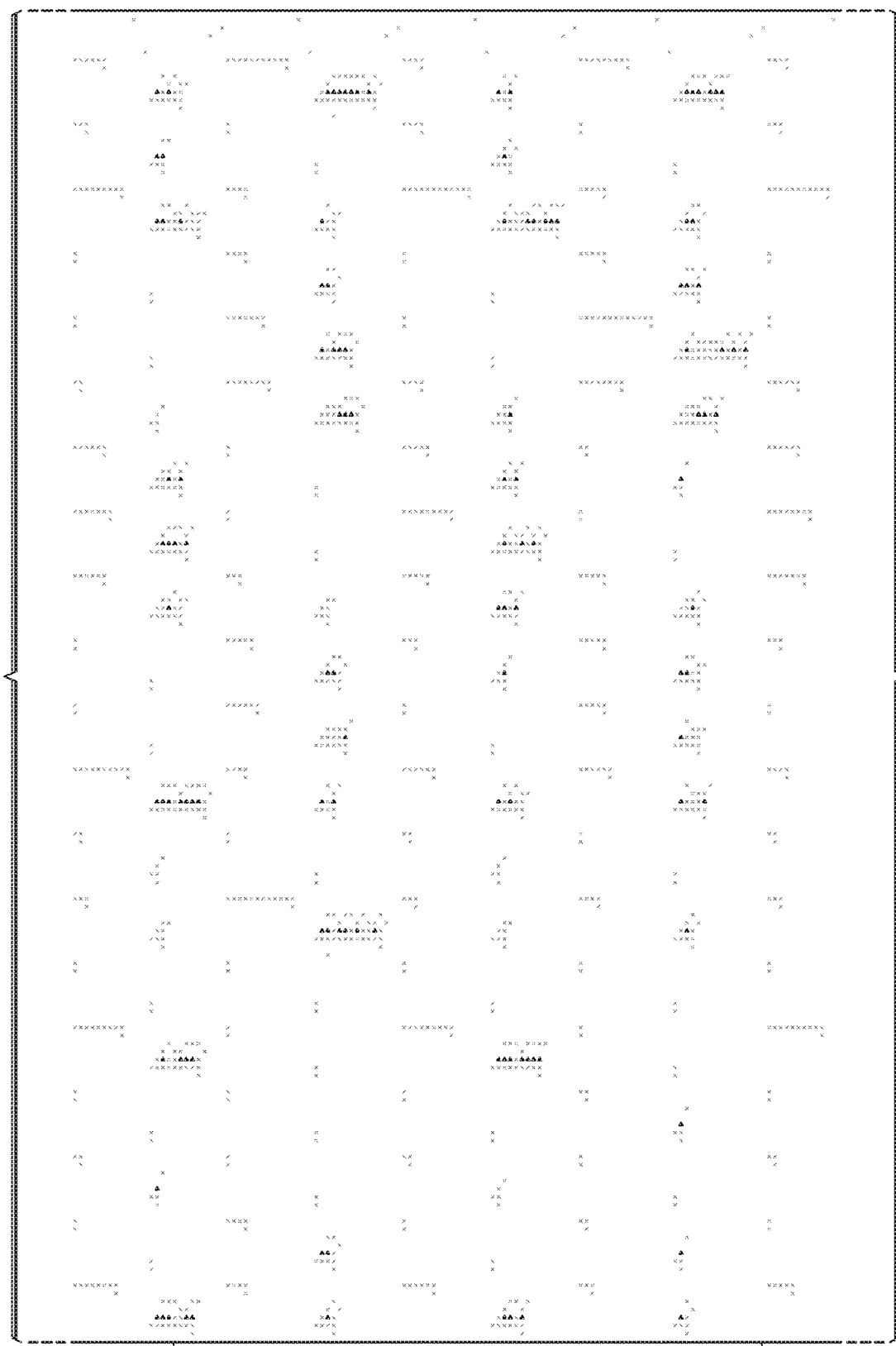
Figure 8D:
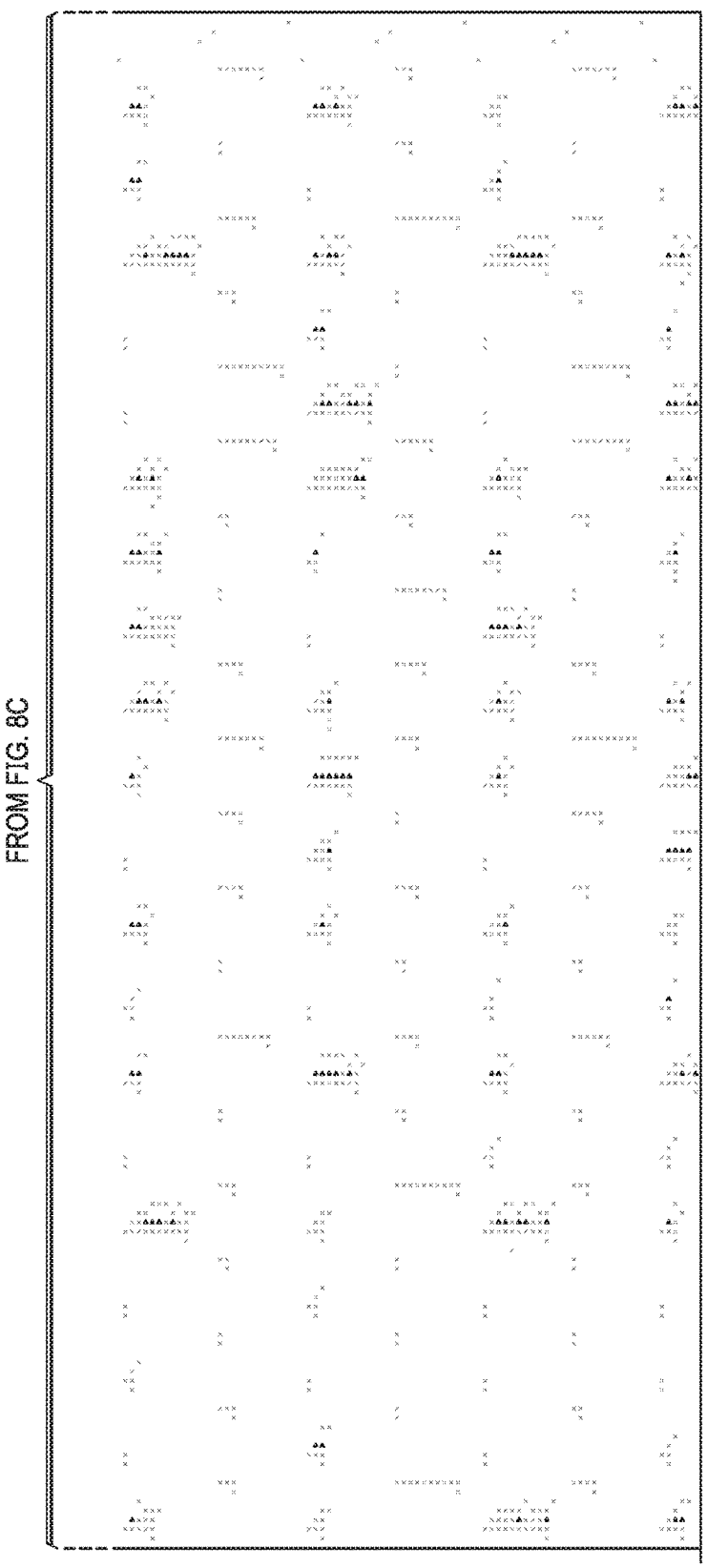

FIG. 8 illustrates a spike raster plot for a one-dimensional random walk, in accordance with an illustrative embodiment. Spike raster plot 800 is for a one-dimensional random walk, with 50% probability in both up and down directions. Walkers begin on units 10 and 13. Closed dots represent spike events; open dots represent failed probability calls (i.e. neuron threshold is met, but the neuron does not spike due to stochasticity). Neurons are grouped by unit, but are not sorted. Each simulation time step requires fewer computational time steps as walkers become more diffuse.

Results

Attention is now turned to the results of density simulations. To examine the density model, we first explored a one-dimensional space where nodes are connected in a cycle, with transitions to adjacent nodes having a 50% probability. Pictured in FIG. 10 is the distribution of walkers with units 10 and 13 being initialized with 30 walkers each. Only the Markov simulation time is shown. The checkerboarding seen is a result of the fact that each node is connected only to two neighbor nodes, and any given walker must move to one of these two options.

The corresponding spike raster for the 1D case is shown in FIG. 8. As expected, the walkers tend towards a uniform distribution. FIG. 8 also illustrates how time is treated differently the density method. The amount of simulation time required to model one time-step of the system evolution is non-deterministic, requiring enough time to potentially move all particles within any given location. Because the system progresses forward synchronously for spatial locations, the model time required to advance is dependent on the distribution of walkers. Because we are modeling a random walk, most simulations will drift towards more diffuse distributions, requiring progressively less time to simulate the model.

Figure 9A:
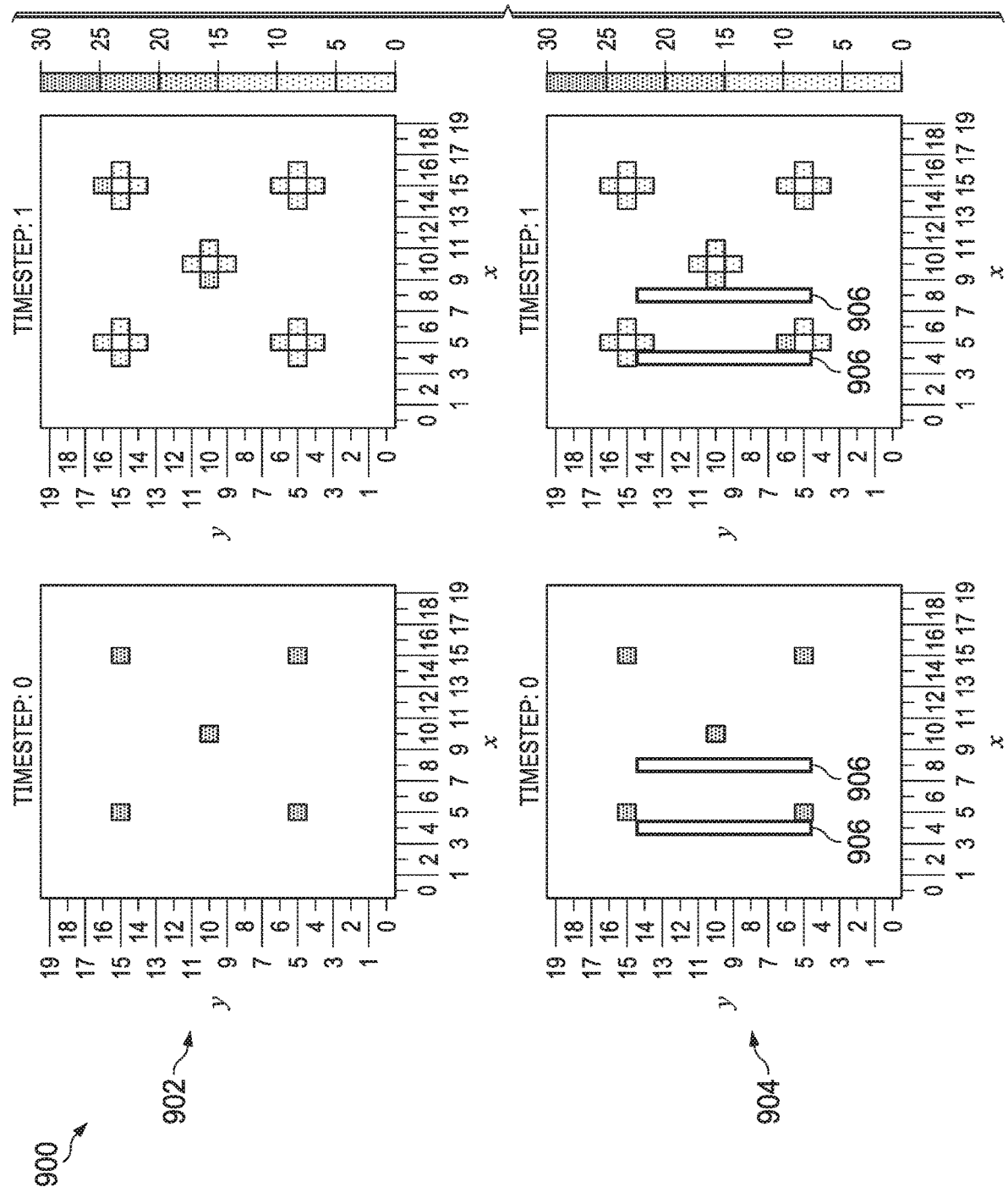
FIGS. 9A-9B illustrate graphs of sample walker distributions from two separate two-dimensional experiments, in accordance with an illustrative embodiment.
Figure 9B:
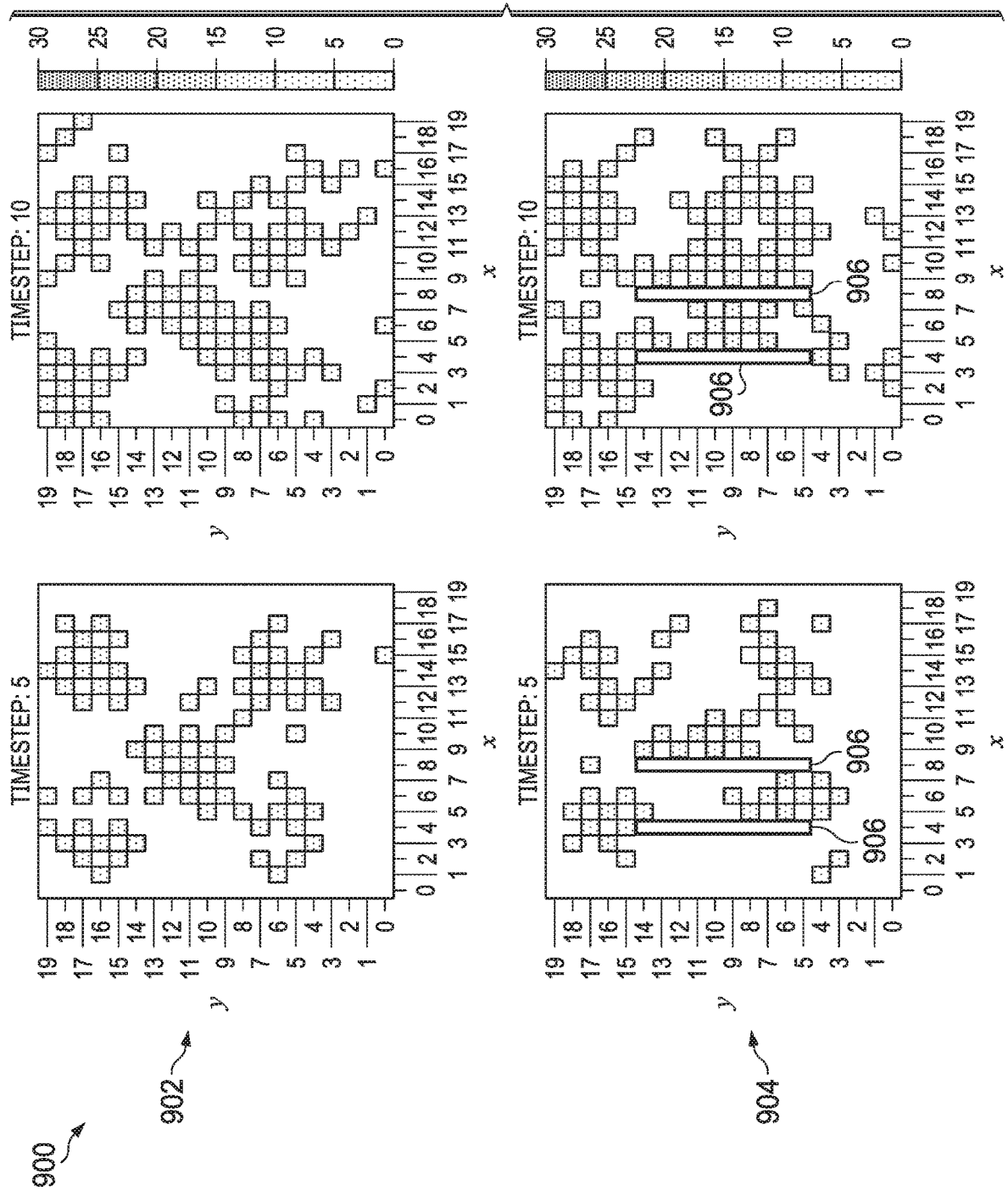
Figure 11:
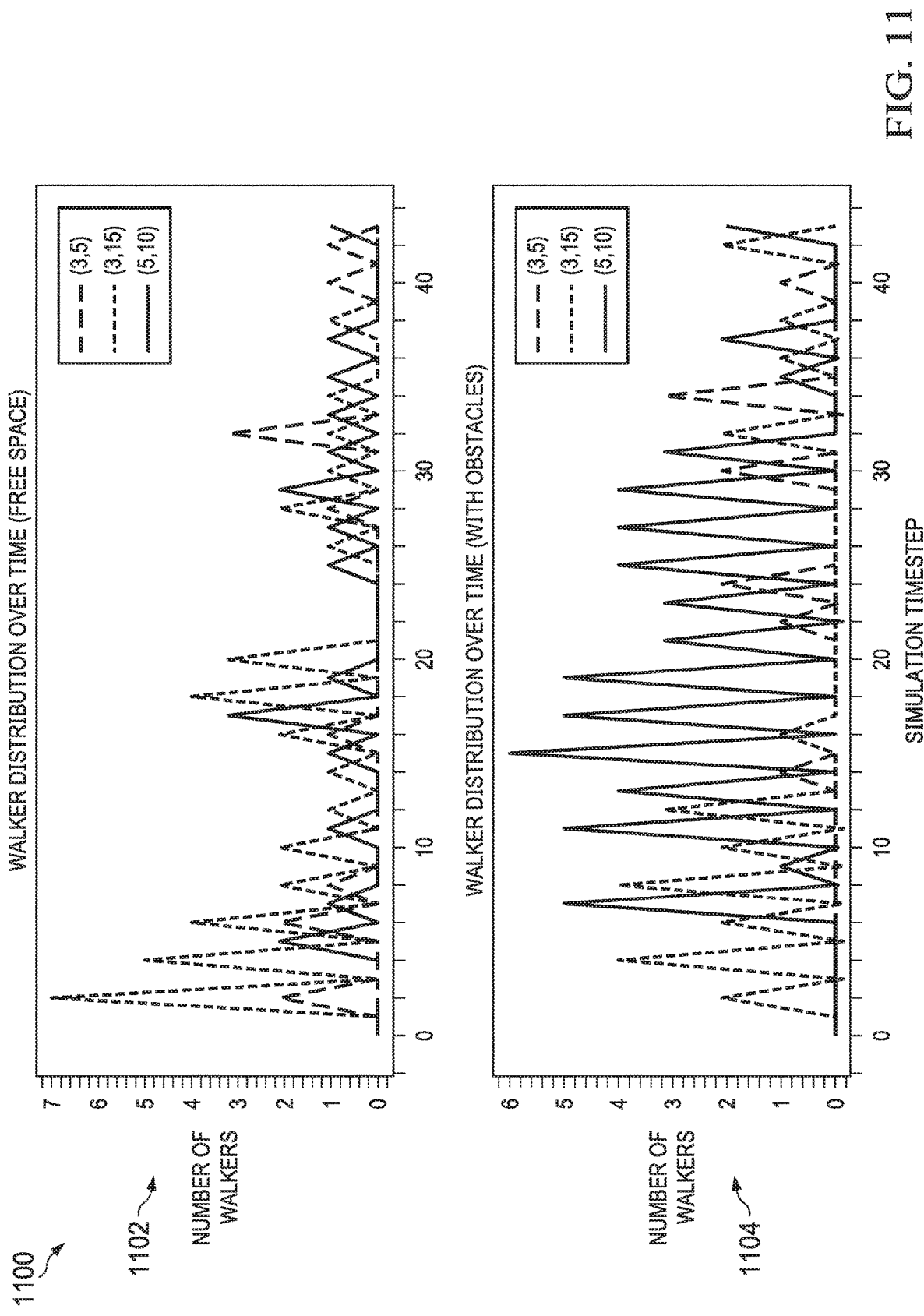
FIG. 11 illustrates graphs of the number of walkers over time at three different locations, in accordance with an illustrative embodiment.

FIG. 9, below, illustrates two time-courses of the density model in two dimensions on a torus. The top half shows an instance where the probabilities are uniform across the space (though weighted towards the up and left directions). The bottom half explores a case where walkers are prevented from entering two disjoint obstacles. In FIG. 11, below, we plot the walker density at three different locations.

FIG. 9 illustrates graphs 900 of sample walker distributions from two separate two-dimensional experiments, in accordance with an illustrative embodiment. In first row 902, thirty walkers start on units (5; 5), (5; 15), (10; 10), (15; 5), (15; 15); directions up, down, left, right have probabilities 35%, 35%, 15%, 15% respectively. In second row 904, the simulation has the same setup, except there are two obstacles (highlighted in areas 906). The walkers have 0 probability to enter areas 906. The probability to enter a wall is distributed evenly to the perpendicular directions.

FIG. 10 illustrates a graph 1000 of walker distribution over time for a one-dimensional random walk, in accordance with an illustrative embodiment. This random walk had a 50% probability in both up and down directions. Walkers begin on units 10 and 13. Units are arranged spatially in a cycle so that walkers can 'wrap around.'

FIG. 11 illustrates graphs 1100 of the number of walkers over time at three different locations, in accordance with an illustrative embodiment. Top graph 1102 corresponds to the top row of FIG. 9, as bottom graph 1104 does with the bottom row. The evolution of the walker distribution is affected by the additional obstacles.

Attention is now turned to conclusions that can be drawn from the above. In this document, we have demonstrated that small-scale neural circuits can efficiently and scalably implement random walk simulations.

Notably, the two models of random walks shown here are functionally equivalent, but each offer advantages under particular circumstances. For instance, the number of neurons required for density method scales with spatial resolution, and the number of particles being modeled is dynamically accounted for in the time required for the model to run. This configuration may thus be well-suited for neuromorphic systems whose neurons are capped at a fixed level whereas the time a simulation can be run is flexible. Thus, the number of particles can be tuned to achieve the statistical significance demanded by an application. Alternatively, the particle method models each walker independently, thus the time for a simulation to run is independent of the number of walkers so long as there are sufficient neurons to represent the requisite spatial resolution within each neuron.

There are several reasons beyond scaling that one method may be preferable to the other. While perhaps not as obvious, the paths taken by individual particles are preserved within the spike timings of the density method; however, the behavior of individual paths is directly retrievable from the particle methods. This feature is of use in models of certain path-dependent financial options for instance [12]. On the other hand, for many applications the density of walkers at a given spatial location and time is the critical output of stochastic process models.

The density method by its nature provides an estimation of the density at all locations of the space at all times, whereas the particle method would require a subsequent integration of information from all of the independent circuits. Finally, the two models here each offer compelling potential advantages on different neuromorphic platforms, such as the IBM TrueNorth chip [13], Intel's Loihi chip [7], Sandia's STPU archiecture [14], and the Manchester SpiNNaker platform [8]. However, we anticipate that these algorithms should map well to these and other platforms, as the highly parallel nature of random walk processes makes them well suited for neuromorphic architectures. We conclude by highlighting the point that the efficient implementation of a strictly numerical process such as the random walk on neuromorphic hardware represents a major new capability for systems generally designed to implement tasks such as neural processing and machine learning.

REFERENCES

T. Chuang and M. Fukuda, "A parallel multi-agent spatial simulation environment for cluster systems," in Computational Science and Engineering (CSE), 2013 IEEE 16th International Conference on. IEEE, 2013, pp. 143-150.

W. Severa, O. Parekh, K. D. Carlson, C. D. James, and J. B. Aimone, "Spiking network algorithms for scientific computing," in Rebooting Computing (ICRC), IEEE International Conference on. IEEE, 2016, pp. 1-8.

M. Davies, N. Srinivasa, T.-H. Lin, G. Chinya, P. Joshi, A. Lines, A. Wild, and H. Wang, "Loihi: A neuromorphic manycore processor with on-chip learning," IEEE Micro, 2018.

S. B. Furber, D. R. Lester, L. A. Plana, J. D. Garside, E. Painkras, S. Temple, and A. D. Brown, "Overview of the spinnaker system architecture," IEEE Transactions on Computers, vol. 62, no. 12, pp. 2454-2467, 2013.

L. Buesing, J. Bill, B. Nessler, and W. Maass, "Neural dynamics as sampling: a model for stochastic computation in recurrent networks of spiking neurons," PLoS computational biology, vol. 7, no. 11, p. e1002211, 2011.

S. Sreenivasan and I. Fiete, "Grid cells generate an analog errorcorrecting code for singularly precise neural computation," Nature neuroscience, vol. 14, no. 10, p. 1330, 2011.

T. H. Cormen, C. E. Leiserson, R. L. Rivest, and C. Stein, Introduction to Algorithms, 2nd ed. MIT Press and McGraw-Hill, 2001.

P. A. Merolla, J. V. Arthur, R. Alvarez-Icaza, A. S. Cassidy, J. Sawada, F. Akopyan, B. L. Jackson, N. Imam, C. Guo, Y. Nakamura et al., "A million spiking-neuron integrated circuit with a scalable communication network and interface," Science, vol. 345, no. 6197, pp. 668-673, 2014.

A. J. Hill, J. W. Donaldson, F. H. Rothganger, C. M. Vineyard, D. R. Follett, P. L. Follett, M. R. Smith, S. J. Verzi, W. Severa, F. Wang et al., "A spike-timing neuromorphic architecture," in Rebooting Computing (ICRC), 2017 IEEE International Conference on. IEEE, 2017, pp. 1-8.

Figure 12:
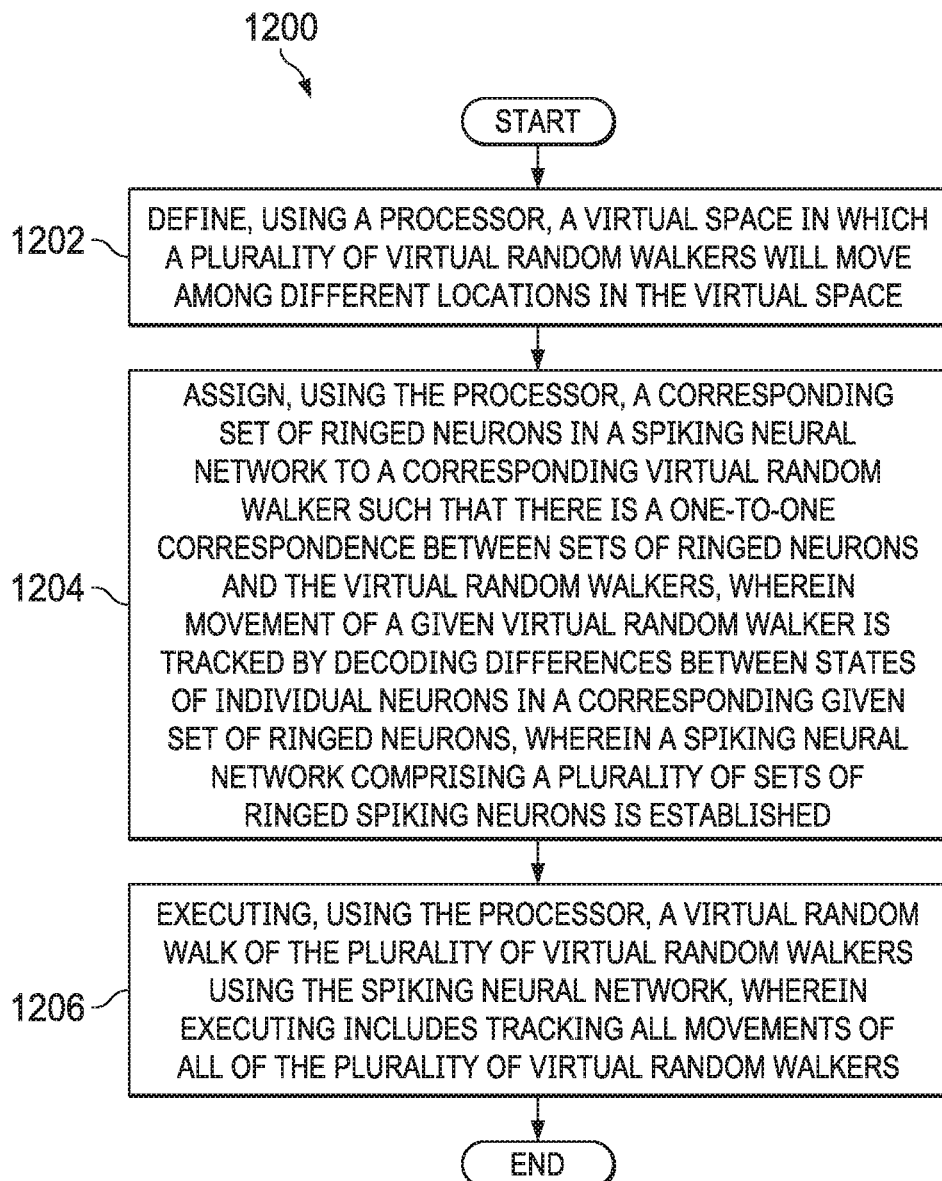
FIG. 12 illustrates a method for increasing a speed or energy efficiency at which a computer is capable of modeling a plurality of random walkers, in accordance with an illustrative embodiment.

FIG. 12 illustrates a method for increasing a speed or energy efficiency at which a computer is capable of modeling a plurality of random walkers, in accordance with an illustrative embodiment. Method 1200 may be implemented in neuromorphic hardware as a spiking neural network. However, method 1200 could be implemented in a traditional Von Neumann computer, though not as efficiently. Thus, the term "processor" with respect to method 1200 includes both neuromorphic processors and traditional processors, but in either case represents a physical processor.

Method 1200 includes defining, using a processor, a virtual space in which a plurality of virtual random walkers will move among different locations in the virtual space (operation 1202). Method 1200 also includes assigning, using the processor, a corresponding set of ringed neurons in a spiking neural network to a corresponding virtual random walker such that there is a one-to-one correspondence between sets of ringed neurons and the virtual random walkers, wherein movement of a given virtual random walker is tracked by decoding differences between states of individual neurons in a corresponding given set of ringed neurons, wherein a spiking neural network comprising a plurality of sets of ringed spiking neurons is established (operation 1204). Method 1200 also includes executing, using the processor, a virtual random walk of the plurality of virtual random walkers using the spiking neural network, wherein executing includes tracking all movements of all of the plurality of virtual random walkers (operation 1206). In one illustrative embodiment, the method may terminate thereafter.

Method 1200 may be varied. For example, in an illustrative embodiment, the corresponding set of ringed neurons comprises a first set of ringed neurons and a second set of ringed neurons, and wherein differences between neuron positions in the first set and the second set determine a position of the corresponding virtual random walker. In another illustrative embodiment, the corresponding set of ringed neurons comprises a first set of ringed neurons, a second set of ringed neurons, and a third set of ringed neurons, and wherein differences between neuron positions in the first set, the second set, and the third set determine a position of the corresponding virtual random walker.

In still another illustrative embodiment, method 1200 may also include using a spike delay to add or subtract a time increment when a given neuron in a given ring will trigger. In yet another illustrative embodiment, method 1200 may also include using a secondary circuit placed on all rings of a given walker to advance or stall triggering of the corresponding set of ringed neurons.

In a different illustrative embodiment, method 1200 may also include storing a result of the virtual random walk on a non-transitory computer readable storage medium. In a still different illustrative embodiment, method 1200 may also include using the result to model a physical process.

Still other variations are possible. Thus, the illustrative embodiments described with respect to FIG. 12 do not necessarily limit the claimed inventions or the other illustrative embodiments described elsewhere herein.

The illustrative embodiments further contemplate an application specific integrated circuit (ASIC) which is physical designed to accomplish method 1200 or any of its variations. Preferably the ASIC takes the form of neuromorphic hardware.

Figure 13:
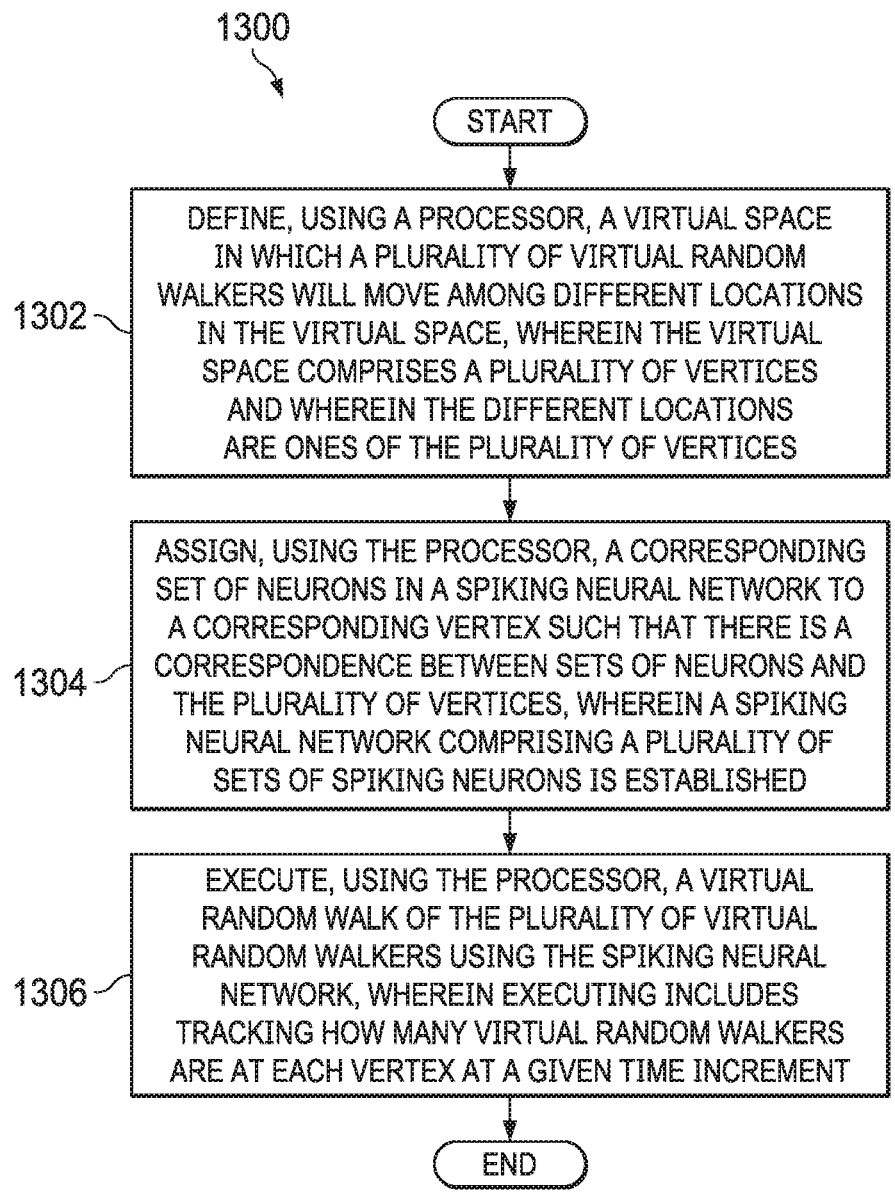
FIG. 13 illustrates a method for increasing a speed or energy efficiency at which a computer is capable of modeling a plurality of random walkers, in accordance with an illustrative embodiment.

FIG. 13 illustrates a method for increasing a speed or energy efficiency at which a computer is capable of modeling a plurality of random walkers, in accordance with an illustrative embodiment. Method 1300 may be implemented in neuromorphic hardware as a spiking neural network. However, method 1300 could be implemented in a traditional Von Neumann computer, though not as efficiently. Thus, the term "processor" with respect to method 1300 includes both neuromorphic processors and traditional processors, but in either case represents a physical processor.

Method 1300 includes defining, using a processor, a virtual space in which a plurality of virtual random walkers will move among different locations in the virtual space, wherein the virtual space comprises a plurality of vertices and wherein the different locations are ones of the plurality of vertices (operation 1302). Method 1300 also includes assigning, using the processor, a corresponding set of neurons in a spiking neural network to a corresponding vertex such that there is a correspondence between sets of neurons and the plurality of vertices, wherein a spiking neural network comprising a plurality of sets of spiking neurons is established (operation 1304). Method 1300 also includes executing, using the processor, a virtual random walk of the plurality of virtual random walkers using the spiking neural network, wherein executing includes tracking how many virtual random walkers are at each vertex at a given time increment (operation 1306). In one illustrative embodiment, the method may terminate thereafter.

Method 1300 may be varied. For example, the sets of neurons may each comprise a corresponding plurality of neurons. In another example, there is a one-to-one correspondence between sets of neurons and the plurality of vertices.

In another illustrative embodiment, executing further includes tracking all movements of all of the plurality of virtual random walkers by tracking in which vertices the plurality of virtual random walkers are located at the given time increment. In yet another illustrative embodiment, the virtual space also includes edges connecting the plurality of vertices in a Euclidian grid. In still another illustrative embodiment, the virtual space also includes edges connecting the plurality of vertices in a non-Euclidian grid.

Method 1300 may also include additional operations. For example, method 1300 may also include using spikes in the spiking neural network to move walkers from vertex to vertex, whereby additional neurons are not required to support additional virtual walkers on the virtual space, and whereby energy efficiency of executing is further improved. In another example, method 1300 may also include storing a result of the virtual random walk on a non-transitory computer readable storage medium; and using the result to model a physical process. In another illustrative embodiment, the physical process is selected from the group consisting of: radiation transport, plasma dynamics, and molecular dynamics. In this case, the illustrative embodiments may include the result being used to track a property selected from the group consisting of: path dependent behavior of particles, interactions of virtual random walkers with one another, interactions of virtual random walkers with an environment in which the virtual random walkers are walking, and combinations thereof.

In another illustrative embodiment, method 1300 may also include using the result to perform a discrete simulation Monte Carlo (DSMC) simulation of a physical process. In still another illustrative embodiment, method 1300 may also include using the result to model an application-specific boundary condition of a physical process.

In still another illustrative embodiment, method 1300 may also include using the result to model information propagation through an online social network. In still another illustrative embodiment, method 1300 may also include using the result to compute a property of a computerized graph database. In this case, the illustrative embodiments may also include estimating a shortest path between nodes of the computerized graph database. Alternatively, the illustrative embodiments may also include finding one of a neighborhood or a clique within the computerized graph database.

Still other variations are possible. Thus, the illustrative embodiments described with respect to FIG. 13 do not necessarily limit the claimed inventions or the other illustrative embodiments described elsewhere herein.

The illustrative embodiments further contemplate an application specific integrated circuit (ASIC) which is physical designed to accomplish method 1200 or any of its variations. Preferably the ASIC takes the form of neuromorphic hardware.

Thus, for example, the illustrative embodiments provide for an application-specific integrated circuit comprising: a processor architecture that implements a spiking neural network comprising a plurality of sets of ringed spiking neurons, wherein each set of ringed spiking neurons is assigned to calculate a single corresponding property of a single corresponding object. The illustrative embodiments further contemplate that the plurality of sets of ringed spiking neurons comprises a first set of ringed neurons and a second set of ringed neurons, and wherein differences between neuron positions in the first set and the second set determine a position of the corresponding virtual random walker.

The illustrative embodiments further contemplate that the plurality of sets of ringed spiking neurons comprises a first set of ringed neurons, a second set of ringed neurons, and a third set of ringed neurons, and wherein differences between neuron positions in the first set, the second set, and the third set determine a position of the corresponding virtual random walker. The illustrative embodiments further contemplate that the processor architecture is further modified to use a spike delay to add or subtract a time increment when a given neuron in a given ring will trigger.

The illustrative embodiments further contemplate that the processor architecture is further modified to use a secondary circuit placed on all rings of a given walker to advance or stall triggering of the corresponding set of ringed neurons. The illustrative embodiments further contemplate that the ASIC may include a non-transitory computer readable storage medium storing results of a virtual random walk.

Figure 14:
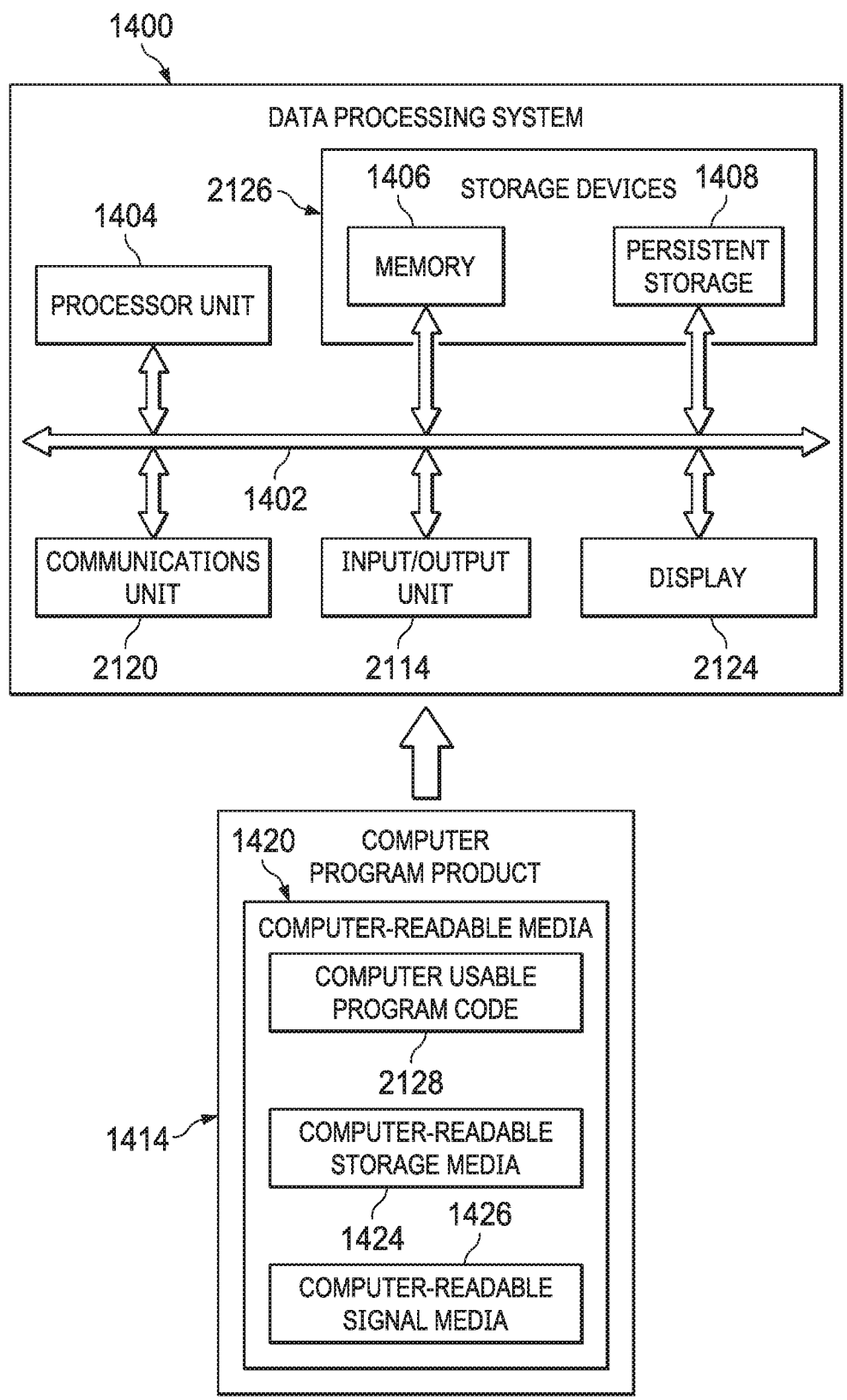
FIG. 14 illustrates a data processing system, in accordance with an illustrative embodiment.

Turning now to FIG. 14, an illustration of a data processing system is depicted in accordance with an illustrative embodiment. Data processing system 1400 in FIG. 14 is an example of a data processing system that may be used to implement the illustrative embodiments, such those described with respect to FIG. 1 through FIG. 13. Note that while the illustrative embodiments are preferably implemented on neuromorphic computing hardware, the techniques of the illustrative embodiments may be modified to operate on a traditional Von Neumann computer, such as data processing system 1400 of FIG. 14.

In this illustrative example, data processing system 1400 includes communications fabric 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. This software may be a content addressable memory, or software for implementing the processes described elsewhere herein. Thus, for example, software loaded into memory 1406 may be software for executing the methods described with respect to FIG. 1 through FIG. 13. Processor unit 1404 may be a number of processors, a multi-processor core, or some other type of processor, depending on the particular implementation. A number, as used herein with reference to an item, means one or more items. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output (I/O) unit 1412 allows for input and output of data with other devices that may be connected to data processing system 1400. For example, input/output (I/O) unit 1412 may provide a connection for user input through a keyboard, a mouse, and/or some other suitable input device. Further, input/output (I/O) unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these examples. In one example, computer readable media 1420 may be computer readable storage media 1424 or computer readable signal media 1426. Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400. In some instances, computer readable storage media 1424 may not be removable from data processing system 1400.

Alternatively, program code 1418 may be transferred to data processing system 1400 using computer readable signal media 1426. Computer readable signal media 1426 may be, for example, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1418 may be omitted because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

As another example, a storage device in data processing system 1400 is any hardware apparatus that may store data. Memory 1406, persistent storage 1408, and computer readable media 1420 are examples of storage devices in a tangible form.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1406, or a cache, such as found in an interface and memory controller hub that may be present in communications fabric 1402.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for modeling random walkers in a circuit, the method comprising:
   defining a virtual space in which a plurality of virtual random walkers will move among different locations in the virtual space, wherein the virtual space comprises a plurality of vertices and wherein the different locations are ones of the plurality of vertices;
   assigning a corresponding set of neurons in a spiking neural circuit to a corresponding vertex in the plurality of vertices such that there is a correspondence between sets of neurons and the plurality of vertices, wherein the spiking neural circuit comprises a plurality of sets of spiking neurons; and
   executing, with the spiking neural circuit, a stochastic process comprising a Markov process that uses the plurality of virtual random walkers, wherein executing includes tracking how many virtual random walkers are at each vertex at a given time increment.

2. The method of claim 1 wherein the sets of neurons each comprise a corresponding plurality of neurons.

3. The method of claim 1 wherein there is a one-to-one correspondence between sets of neurons and the plurality of vertices.

4. The method of claim 1 wherein executing further includes tracking all movements of all of the plurality of virtual random walkers by tracking in which vertices the plurality of virtual random walkers are located at the given time increment.

5. The method of claim 1 wherein the virtual space also includes edges connecting the plurality of vertices in a Euclidian grid.

6. The method of claim 1 wherein the virtual space also includes edges connecting the plurality of vertices in a non-Euclidian grid.

7. The method of claim 1 further comprising:
   using spikes in the spiking neural circuit to move walkers from vertex to vertex, whereby additional neurons are not required to support additional virtual walkers on the virtual space, and whereby energy efficiency of executing is further improved.

8. The method of claim 1 further comprising:
   storing a result of the virtual random walk on a non-transitory computer readable storage medium.

9. The method of claim 8 further comprising:
   using the result to model a physical process.

10. The method of claim 9 wherein the physical process is selected from the group consisting of: radiation transport, plasma dynamics, and molecular dynamics.

11. The method of claim 8 wherein the result is used to track a property selected from the group consisting of: path dependent behavior of particles, interactions of virtual random walkers with one another, interactions of virtual random walkers with an environment in which the virtual random walkers are walking, and combinations thereof.

12. The method of claim 8 further comprising:
    using the result to perform a discrete simulation Monte Carlo (DSMC) simulation of a physical process.

13. The method of claim 8 further comprising:
using the result to model an application-specific boundary condition of a physical process.

14. The method of claim 8 further comprising:
using the result to model information propagation through a social network.

15. The method of claim 8 further comprising:
using the result to compute a property of a computerized graph database.

16. The method of claim 15 further comprising:
estimating a shortest path between nodes of the computerized graph database.

17. The method of claim 15 further comprising:
finding one of a neighborhood or a clique within the computerized graph database.

18. An application-specific integrated circuit (ASIC) configured to execute a stochastic process comprising a Markov process, the ASIC comprising:
a processor architecture that implements a spiking neural circuit comprising a plurality of sets of spiking neurons, wherein each set of spiking neurons is assigned to calculate how many virtual random walkers are at each vertex in a defined virtual space at a given time increment, wherein the processor architecture further implements: using spikes in the spiking neural circuit to move walkers from vertex to vertex, whereby additional neurons are not required to support additional virtual walkers on the virtual space, and whereby energy efficiency of executing is further improved.

19. The application-specific integrated circuit of claim 18 wherein the processor architecture further implements: storing a result of the virtual random walk on a non-transitory computer readable storage medium; and using the result to model a physical process.

20. The method of claim 1, wherein the circuit comprises:
neuromorphic hardware; or
a field programmable logic array.

21. The applications-specific integrated circuit of claim 18, wherein the processor architecture is implemented in neuromorphic hardware.

* * * * *